United States Patent [19]
Kanungo et al.

[11] Patent Number: 5,870,084
[45] Date of Patent: Feb. 9, 1999

[54] SYSTEM AND METHOD FOR EFFICIENTLY STORING AND QUICKLY RETRIEVING GLYPHS FOR LARGE CHARACTER SET LANGUAGES IN A SET TOP BOX

[75] Inventors: Rajesh Kanungo, Sunnyvale; Richard K. Motofuji, Kensington, both of Calif.

[73] Assignee: Thomson Consumer Electronics, Inc., Indianapolis, Ind.

[21] Appl. No.: 747,207

[22] Filed: Nov. 12, 1996

[51] Int. Cl.⁶ .............................. G06F 12/00; H04N 7/10
[52] U.S. Cl. ................. 345/192; 704/8; 348/468
[58] Field of Search ............... 704/8; 348/467, 348/468, 473, 10; 345/192, 193, 194, 195, 468, 467; 455/6.2

[56] References Cited

U.S. PATENT DOCUMENTS

| | | | |
|---|---|---|---|
| 4,700,322 | 10/1987 | Benbassat et al. | 704/260 |
| 5,294,982 | 3/1994 | Salomon et al. | 348/461 |
| 5,416,898 | 5/1995 | Opstad et al. | 345/468 |
| 5,519,443 | 5/1996 | Salomon et al. | 348/467 |
| 5,526,477 | 6/1996 | McConnell et al. | 345/467 |
| 5,570,134 | 10/1996 | Hong | 348/467 |
| 5,623,593 | 4/1997 | Spells, III | 345/472 |
| 5,664,086 | 9/1997 | Brock et al. | 345/468 |
| 5,706,462 | 1/1998 | Matousek | 345/193 |
| 5,734,388 | 3/1998 | Ristow et al. | 345/472 |

FOREIGN PATENT DOCUMENTS

| | | |
|---|---|---|
| 95 15654 | 6/1995 | WIPO. |
| 95 28799 | 10/1995 | WIPO. |
| 95 31069 | 11/1995 | WIPO. |

OTHER PUBLICATIONS

Dialog File 148, Acc. No. 06719264: Petzold, "Move Over, ASCII!, Unicode is Here." *PC Magazine* v.12 N. 18, p. 374 (3), Oct. 26, 1993.

Garr, M.J. et al., "Data Broadcasting in the USA Low Cost Delivery Alternative and More," IEEE Transactions on Consumer Electronics, vol. 36, No. 4, Nov. 1, 1990, pp. 877–884.

*Primary Examiner*—Joseph Thomas
*Attorney, Agent, or Firm*—Bruce J. Bowman; Jeffrey D. Carter

[57] ABSTRACT

A system and method for receiving and rendering Unicode text in multiple languages on a set top box is disclosed. The system includes a set top box which receives an application program from a broadcast station. The set top box executes the application program. The application program includes Unicode character encoding text for display on a television coupled to the set top box. An operating environment running on the set top box includes a Unicode encoding engine which the application program invokes to display Unicode text. The encoding engine determines the language of characters in the text and invokes a rendering engine corresponding to the language of each character, thus enabling characters from different languages to be mixed in the same text string. The rendering engine has specific knowledge of the language, such as rendering direction and context. One or more glyph sets may be plugged in to the set top box to support different languages and fonts according the locale in which the set top box will be used. The rendering engine renders the characters using the glyphs in the glyph sets. Furthermore, glyphs not present in the set top box may be downloaded to the set top box along with the application program and rendered by a rendering engine. A set top box and method for efficiently storing and quickly retrieving the large number of Japanese Unicode characters using a hash table and hashing method in the set top box is also disclosed.

36 Claims, 13 Drawing Sheets

SYSTEM AND METHOD FOR EFFICIENTLY STORING AND QUICKLY RETRIEVING GLYPHS FOR LARGE CHARACTER SET LANGUAGES IN A SET TOP BOX

BACKGROUND OF THE INVENTION

1. Field of the Invention

The invention relates to digital television systems and more particularly to hashing methods for efficient storage and quick retrieval of characters for languages with large character sets in a set-top box of the system.

2. Description of the Related Art

The emerging technology of digital television systems holds a promise of allowing a television set to provide a vast array of new services. Digital television systems are capable of displaying text and graphic images in addition to typical video program streams. An example of digital television services which make use of text and graphic image display is interactive television. Proposed features of interactive television accommodate a variety of marketing, entertainment and educational capabilities such as allowing a user to order an advertised product or service, compete against contestants in a game show, or request specialized information regarding a televised program.

Typically, the interactive functionality is controlled by a set top box connected to a television set. The set top box executes an interactive program written for a television broadcast. The interactive functionality is displayed upon the television set screen and may include icons or menus to allow a user to make selections via the television's remote control.

Interactive television, and other broadcast communication systems in general which deliver textual data, often require support for multiple languages. For example, program guides are advertising tools used by program providers may desire to include descriptions of television programs in multiple languages, such as English mixed with Japanese. In addition, end users may receive data from non-native regions, such as a Chinese broadcast being received by a television viewer in India.

It is highly desirable that a set top box owner be able to use the same set top box to receive textual information in more than one language. That is, it is desirable that the user not have to buy a different set top box to receive textual information in each different language. A language, in this context, may be defined as a written system of representing thoughts, ideas, actions, etc. A language includes, inter alia, a grammar, characters, and words.

The characters and symbols used in writing a language are commonly referred to as a "writing system", or "script." Many languages, such as Western European languages, are written with alphabetic and numeric characters. However, Japanese, for example, is written with phonetic Hiragana and Katakana characters as well as alphabetic and numeric characters from Western languages and the ideographic Kanji characters which are largely taken from the Chinese language. The scripts of many languages may share common characters, as in the Western European languages.

The textual information received by a set top box includes strings of characters. A "character" is an atomic symbol in a writing system. In alphabetic languages, this symbol consists of a single letter of the alphabet. In ideographic languages such as Chinese and Japanese, a character could be alphabetic, phonetic, or ideographic.

A "character set" is a group of characters used to represent a particular language or group of languages. A "character encoding" is a system for numerically representing the characters of a character set. A well-known example of a character encoding is the ASCII character encoding. The numeric value associated with a given character in a character set is referred to as a "code point", or "encoding value." The set of numeric values associated with a code set is referred to as a "code set."

The ASCII character encoding provides an encoding for a character set of the alphabet, numbers, and other characters used in the English language. The ASCII code set includes the values 0–127. Thus, each ASCII character has a unique assigned value which may be contained in 7 bits of a byte of data. For example, the character 'A' has a value 0x41 associated with it in ASCII. Many software library routines have been developed to manipulate, read and write strings of ASCII characters.

Other character encoding sets exist, which provide support for multiple languages, such as the ISO Latin character encoding which is used to represent many of the alphabetic languages in the world. ISO Latin includes a Basic Latin portion range of values (0–127) and an Extended Latin portion (values 128–255).

Another example of a character encoding is the Japanese Industrial Standard (JIS) character encoding. JIS uses a 7-bit multi-byte encoding mechanism to represent Japanese text.

A character encoding which enables the representation of characters from many different languages and character sets using a single encoding scheme is referred to as a "multi-lingual" character encoding. An example of a multi-lingual character encoding is the EUC (Extended UNIX Code) character encoding standard. EUC is typically used to represent ideographic Asian languages in the UNIX environment. EUC combines single byte ASCII characters with multi-byte ideographic character encodings. However, EUC allows only a few languages to be encoded at a time.

Developing new software library routines to deal with strings in multiple character encodings and/or multiple languages may be prohibitive in terms of cost and time. Furthermore, it may be prohibitive in terms of storage space and/or code maintenance to support libraries to handle characters in multiple character encodings and languages.

Some scripts combine characters to form composed characters whose shape is determined by the relative positions of the characters, i.e., the context of the characters. Examples of these "contextual scripts" are scripts for the Arabic, Hebrew, Thai, and all Indic languages. In contrast, "non-contextual scripts", such as the Roman alphabet used in Western languages, represent each character as a separate object of fixed shape, independent of the position in a word and of the neighboring characters.

Each character of a character set has a unique shape which distinguishes it from other characters in the character set, that is, which allows a reader to distinguish the character from other characters and thus unambiguously convey information. The shape assigned to a particular character is referred to as the "glyph" of the character. The English letter 'A', for example, has a unique glyph which makes it recognizable from other characters.

Glyphs may have a particular style associated with them. That is, an English 'A' may be written in many different styles, such as in a block style or a calligraphic style. However, the style maintains the basic shape of the character such that the glyph is still recognizable as an 'A.' A collection of glyphs sharing a common style is referred to as a "font." Examples of common fonts are Courier, Times Roman, and Helvetica.

A variety of glyph representation schemes exist. A common scheme is a bitmap glyph, or font. In a bitmap font, the glyph of a given character includes a sequence of bits corresponding to an array of pixels on a display screen. Each bit indicates if the corresponding pixel is to be illuminated or not based on the value of the bit. The pixel array has a characteristic width and height. For example, a glyph may be 24 pixels wide and 24 pixels high. In this example, 576 bits, or 72 bytes, of storage are required to store the glyph.

If the glyphs in a font are the same number of pixels in width, the font is said to be a non-proportional font. If the width is variable, the font is said to be a proportional font. Another common glyph representation scheme is an outline font. A property of outline fonts is that they typically facilitate scaling and rotating.

A set top box receives text encoded according to a character encoding and displays the text on a television. The act of processing the image of a character, i.e., the glyph associated with the character, and displaying the character is referred to as "rendering." A rendering program must use font type information, size information, and potentially contextual information in order to properly render a given character in a given script.

Transmission bandwidth in digital broadcast systems is a precious commodity. Hence, there is a motivation to minimize the number of bytes transmitted to the set top box with regard to the displaying of text.

Languages which have a relatively large number of characters, such as Chinese, Japanese, and Korean, pose particular problems in the context of text processing and rendering in digital television systems. One problem is the large time to search through such a large set of characters to find a glyph associated with a given code point. The combined Chinese, Japanese, and Korean character sets constitute over 120,000 characters. Secondly, the amount of memory required to store fonts and/or transmission bandwidth required to transmit fonts may be costly.

In many circumstances, set top boxes are a commodity item. Hence, a multi-lingual capable set top box which costs significantly more than a uni-lingual set top box may not be accepted readily in the market place. On the other hand, the set top box must deliver performance which is acceptable at a given cost. Thus, the factor of cost versus performance figures in to the design of a set top box.

Two components of a typical set top box which have a large bearing on its cost are its memory and processor. If multiple languages are supported, particularly if the languages have a large number of characters, such as Chinese, Japanese, or Korean, a large amount of memory may be required to store the fonts for the languages. More powerful processors provide higher performance of functions such as character lookup and rendering, but at a greater cost.

SUMMARY OF THE INVENTION

The problems outlined above are in large part solved by a system and method of the present invention for efficiently storing and quickly retrieving glyphs for large character set languages in a set top box of a digital television system. In one embodiment, the system comprises a set top box which is configured to receive text, the characters of which are encoded according to a multi-lingual character encoding standard, "Unicode". The set top box is further configured to process the Unicode text, and render the text for display on a television coupled to the set top box. The set top box is configured with an operating environment which accepts language-specific glyph sets to be modularly "plugged in" to the set top. One or more glyph sets can be plugged into the set top box to support one or more languages as desired. Glyphs or glyph sets may be downloaded into the set top box along with the application program in the event that a given glyph is not present in the set top box. The set top box may also employ an improved hashing method for efficiently storing and quickly retrieving characters of a language with large number of characters, such as Japanese.

An application developer develops an application program, such as an interactive TV program, using development tools and libraries such that the textual data in the application program are Unicode characters. Preferably, the textual data is included in a resource file, which is separate from the instructions of the application program. A broadcast center mixes the application program, including the resource file, with a digital audio/video data stream. The audio/video stream includes the data for playing the television program or commercial to be shown on the user's television. Typically, the audio/video stream is compressed using a compression algorithm such as one of the Motion Picture Expert Group (MPEG) compression standards. The broadcast center transmits the data stream to the set top box. The data stream is transmitted by a suitable transmission mechanism, such as via satellite or coaxial cable.

The set top box receives the stream of digital data from the broadcast center. The set top box de-multiplexes the audio/video stream portion from the application program and stores the application program in local memory of the set top box. The set top box decompresses the audio/video data stream for display on the television. A processor in the set top box executes the application program.

The operating environment running on the set top box is configured to manage the different tasks, such as the application program, which are executed by the set top box. Preferably, the operating environment includes an interpreter which interprets code instructions which are processor independent. Preferably, the application program is interpreted by the interpreter.

The interpreter includes a Unicode encoding engine which includes library functions for manipulating and printing Unicode character strings. The application program calls the Unicode character string functions to perform string manipulations such as determining Unicode string lengths, copying Unicode strings and connecting Unicode strings. The application program also calls string display functions of the Unicode engine.

The interpreter further comprises a language detector. The Unicode engine invokes the language detector to determine a language associated with a given character of the Unicode string. The Unicode engine uses the language and the font set by the application program to determine which of the one or more glyph sets of the set top box includes the glyph for the character. The interpreter further includes one or more rendering engines for rendering glyphs of a given language and font.

Glyphs or glyph sets may also be downloaded to the set top box as needed. If the application is configured to display a glyph which is not present in the set top box, i.e., not plugged-in to the set top box, the glyph may be downloaded along with the application to the set top box. The Unicode engine detects a condition where a glyph referenced by the application is not burned in to the set top box, and searches a list of downloaded glyphs to detect the presence of the referenced glyph. If the Unicode engine detects the presence of the downloaded glyph, the Unicode engine invokes the appropriate rendering engine to render the downloaded glyph.

Each rendering engine is configured to render strings of characters according to the rendering rules for its particular language and font. For example, a rendering engine for a contextual language knows how to render characters in a string based on the context of each character. Furthermore, a rendering engine may have specific knowledge about the standards of a given region, such as regarding time, date, and currency symbols. Furthermore, a rendering engine must know the direction in which the characters are to be rendered. For example, an Arabic rendering engine would render the characters from right to left, whereas a French rendering engine would render the characters from left to right.

The glyph sets are preferably arranged in a manner conducive to efficient storage and retrieval of the glyphs in the glyph set, according to the characteristics of the language associated with the glyph set. Glyph sets for languages with a large number of characters may be stored and retrived using a hash table according to a hashing method. The hash method may yield a relatively small maximum number of collisions with a large percentage of the code points hashing to elements with approximately half the maximum number of collisions or less.

Each glyph set has an associated rendering engine. The Unicode engine invokes the appropriate rendering engine to process and render each Unicode string of the text. A rendering engine renders a character by receiving a glyph associated with a Unicode character and populating a pixel map according to the glyph information. A pixel map is a string of bits indicating the state of each pixel in an array of pixels. For example, in the case of a bitmap glyph of a non-contextual language, rendering the glyph includes copying the glyph bit map to the appropriate location in memory. The pixel map may further include other property information, such as color.

The rendering engine processes and renders characters of the string until the rendering engine encounters a character which does not belong to its language. If the rendering engine did not process the entire string, the Unicode engine updates the string pointer to point to the next character in the string which was not processed by the rendering engine, invokes the language detector to determine the language associated with that character, and invokes the appropriate rendering engine. The process continues until all the text has been rendered.

The rendering engines pass the pixel maps to a graphics driver which controls the video hardware of the set top box. The graphics driver provides the pixel maps to the video hardware of the set top box such that the text is displayed in the appropriate coordinates on the television display screen.

The set top box multiplexes the decompressed audio/video stream with the rendered text and displays the audio/video information and rendered text on the television.

Thus, the television system and method may advantageously provide a means for receiving and rendering text in multiple languages, and do so in a manner which maximizes code reusability thus minimizing development and maintenance time and cost by providing the ability to process text including characters in a universal character encoding. The system and method may further minimize the broadcast bandwidth required to receive and render multiple languages by providing pluggable language-specific modules.

Broadly speaking, the hashing method for efficiently storing the Unicode characters for a given language includes receiving a Unicode character code point and glyph, allocating storage for a hash bin to store the character, and storing the code point and glyph in the hash bin. The method further includes calculating an index according to an equation, $$\text{index}=((((\text{encoding\_value}\ \&\ \text{MASK1})\!>\!>\!\text{SHIFTVAL})\hat{}\ \text{encoding\_value})\ \&\ \text{MASK2}),$$

MASK1, MASK2, and SHIFTVAL being predefined constants, calculating a reference to a hash bin list by indexing into a hash table of references to hash bin lists using the index, and adding the hash bin to the hash bin list. The steps are performed for each character in the language.

The invention further contemplates a hashing method for quickly retrieving the glyph of a Unicode character for a given language including receiving a code point of the character, calculating an index according to an equation, $$\text{index}=((((\text{encoding\_value}\ \&\ \text{MASK1})\!>\!>\!\text{SHIFTVAL})\hat{}\ \text{encoding\_value})\ \&\ \text{MASK2}),$$

MASK1, MASK2, and SHFTVAL being predefined constants, calculating a reference to a hash bin list by indexing into a hash table of references to hash bin lists using the index. A hash bin includes an encoding value and a glyph. The method further includes searching the referenced hash bin list until finding a hash bin whose encoding value is equal to the encoding value of the character received, and returning the glyph from that hash bin.

BRIEF DESCRIPTION OF THE DRAWINGS

Other objects and advantages of the invention will become apparent upon reading the following detailed description and upon reference to the accompanying drawings in which.

Figure 1:
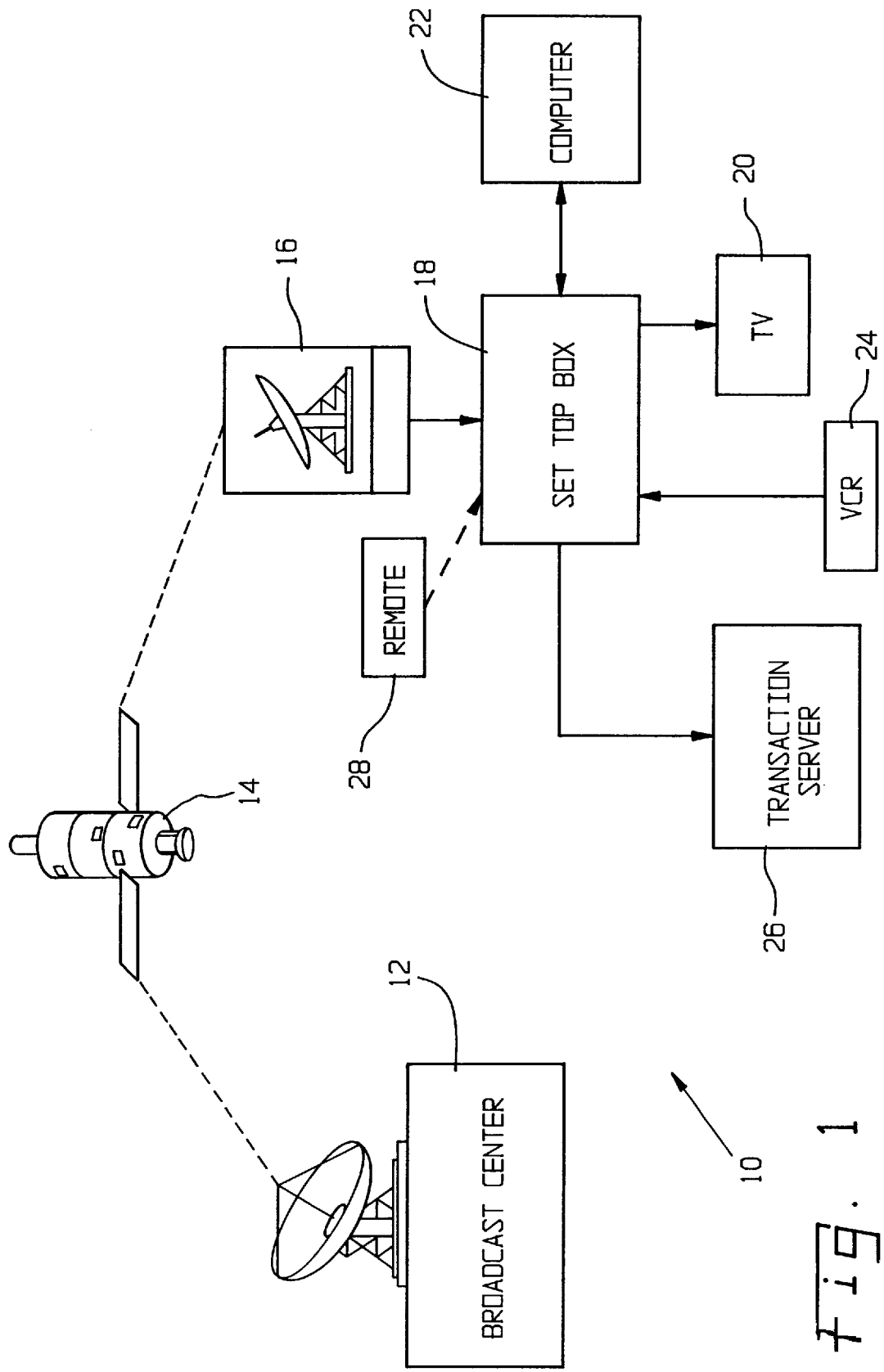
FIG. 1 is a block diagram of a television system according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Referring now to FIG. 1, a block diagram of a television system 10 according to one embodiment is shown. The system 10 comprises a broadcast center 12 which transmits a stream of digital data to a set top box 18, also referred to as a digital interactive decoder (DID). Preferably, the broadcast center 12 transmits the digital data stream to a satellite 14 which transmits the digital data stream to an antenna 16 coupled to the set top box 18. In one embodiment, the broadcast center 12 transmits the digital data stream to the set top box 18 via a cable, such as a coaxial or fiber optic cable. The set top box 18 receives the digital data stream from the antenna 16 or cable and displays a portion of the information from the digital data stream on a television 20 coupled to the set top box 18.

The set top box 18 receives user input from a remote control 28. Preferably, the set top box 18 provides a portion of the user input to a transaction server 26. For example, the set top box 18 may display a menu for ordering a product, such as a hammer. The user may provide input indicating the desire to purchase the hammer. The set top box 18 provides the purchase information to the transaction server 26 which forwards the purchase information to the hammer manufacturer or distributor so that the product may be distributed and billed to the user.

The digital data stream comprises an audio/video portion and an application program portion. The audio/video portion comprises the digital audio and video information for a television program or television commercial to be displayed on the television 20. Preferably, the audio/video stream is compressed using a common compression algorithm such as MPEG 2.

The application program portion of the digital data stream comprises instructions and data to be executed on the set top box 18. Preferably, the application program is configured to display text on the television 20 which is coordinated with the television program or television commercial of the audio/video data stream displayed on the television 20. For example, the application program may execute instructions to display a menu for ordering the hammer. The audio/video data stream portion and the application program portion are mixed together, preferably in the broadcast center 12, to produce the digital data stream transmitted to the set top box 18.

Preferably, the application program includes textual information such as a menu, including strings of characters in multiple languages. The set top box 18 is configured to receive the application program and process the strings of characters of the application program and render the characters for display on the television 20.

A video cassette recorder (VCR) 24 may also be coupled to the set top box 18. The set top box 18 may control the VCR 24 to perform actions according to application programs downloaded to the set top box 18. An example is the set top box 18 controlling the VCR 24 to perform automated recording.

A computer 22 may also be coupled for communication with the set top box 18. The computer 22 may also download application programs to the set top box 18. Further, the set top box 18 may use resources of the computer 22, such as a hard disk, as permanent storage. The computer 22 may be locally connected, such as through a serial connection, or remotely connected via a telephone line.

Figure 2:
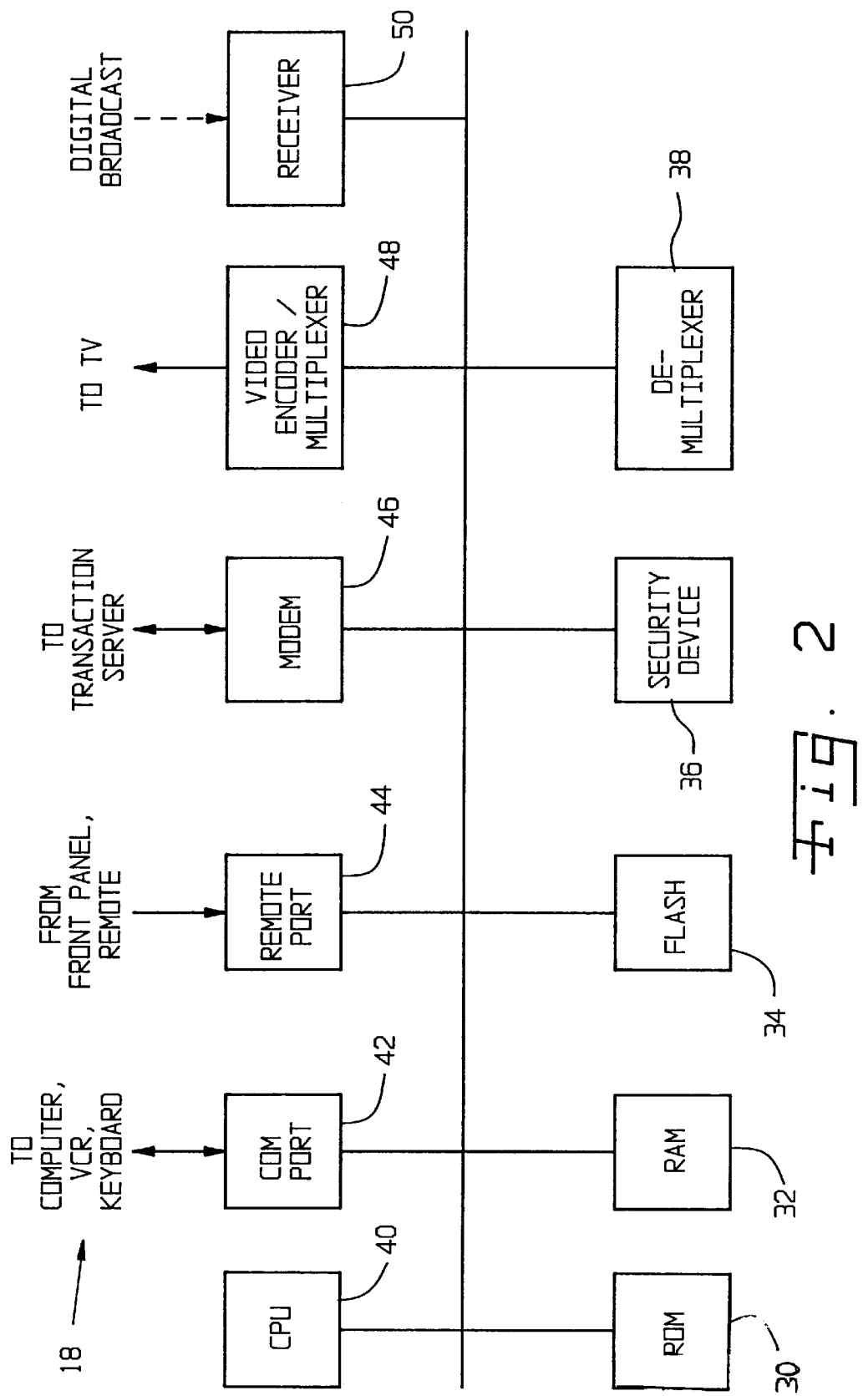
FIG. 2 is a block diagram of the set top box of the system of FIG. 1.

Referring now to FIG. 2, a block diagram of the set top box 18 of FIG. 1 is shown. Set top box 18 comprises CPU 40 coupled to a read-only memory (ROM) 30. The ROM 30 includes instructions and data for executing on the CPU 40. A random access memory (RAM) 32 is coupled to the CPU. The RAM 32 is used for storing program variables for the program instructions contained in the ROM 30. The RAM 32 is also configured to store the application program received from the broadcast center 12 (of FIG. 1). A FLASH memory 34 is also coupled to the CPU 40 and contains program instructions for execution on the CPU 40 and/or character glyphs used in rendering text characters on the television 20 (of FIG. 1).

The CPU 40 comprises a microprocessor, microcontroller, digital signal processor (DSP), or other type of software instruction processing device. The CPU 40 fetches instructions from the ROM 30, RAM 32, and/or FLASH 34 and executes the instructions.

The ROM 30 comprises read only memory storage elements as are well known in the art of solid state memory circuits. Preferably, the ROM 30 comprises read only memory storage which is programmed and plugged in to the set top box 18.

The RAM 32 comprises dynamic random access memory (DRAM) or static random access memory (SRAM) storage elements as are well known in the art of solid state memory circuits.

The FLASH memory 34 comprises writable permanent memory storage elements as are well known in the art of solid state memory circuits. Preferably, the FLASH 34 comprises memory storage which may be programmed, i.e., written, during operation of the set top box 18.

A security device 36 is also coupled to the CPU 40 for providing authentication and signature functionality. For example, the security device allows the enabling or disabling of application program downloading to the set top box 18.

A communications port 42 is coupled to the CPU 40 and is configured to provide communication with other devices such as the computer 22 (of FIG. 1), the VCR 24 (of FIG. 1), or other devices such as a keyboard. A remote control port 44 is coupled to the CPU 40 and is configured to receive remote input such as from the remote control 28 (of FIG. 1) or from a front panel on the set top box 18. Preferably, the remote port 44 comprises an infra-red receiver for receiving infra-red signals from the remote control 28. A modem 46 is coupled to the CPU 40 and is configured to provide communication between the set top box 18 and the transaction server 26 (of FIG. 1).

A demultiplexer 38 is coupled to the RAM 32 and is configured to receive the digital data stream from a receiver 50 coupled to the demultiplexer 38. The receiver 50 receives the digital data stream from the broadcast center and communicates the digital data stream to the demultiplexer 38. The demultiplexer 38 is configured to demultiplex the application program from the audio/video data stream of the digital data stream received from the broadcast center 12 and store the application program in the RAM 32.

The CPU 40 executes the application program stored in the RAM memory and provides rendered textual data from the application program to a video encoder/multiplexer 48. The video encoder/multiplexer 48 multiplexes the rendered text with the audio/video stream and provides the multiplexed rendered text and audio/video stream to the television 20 for display on the television.

Figure 3:
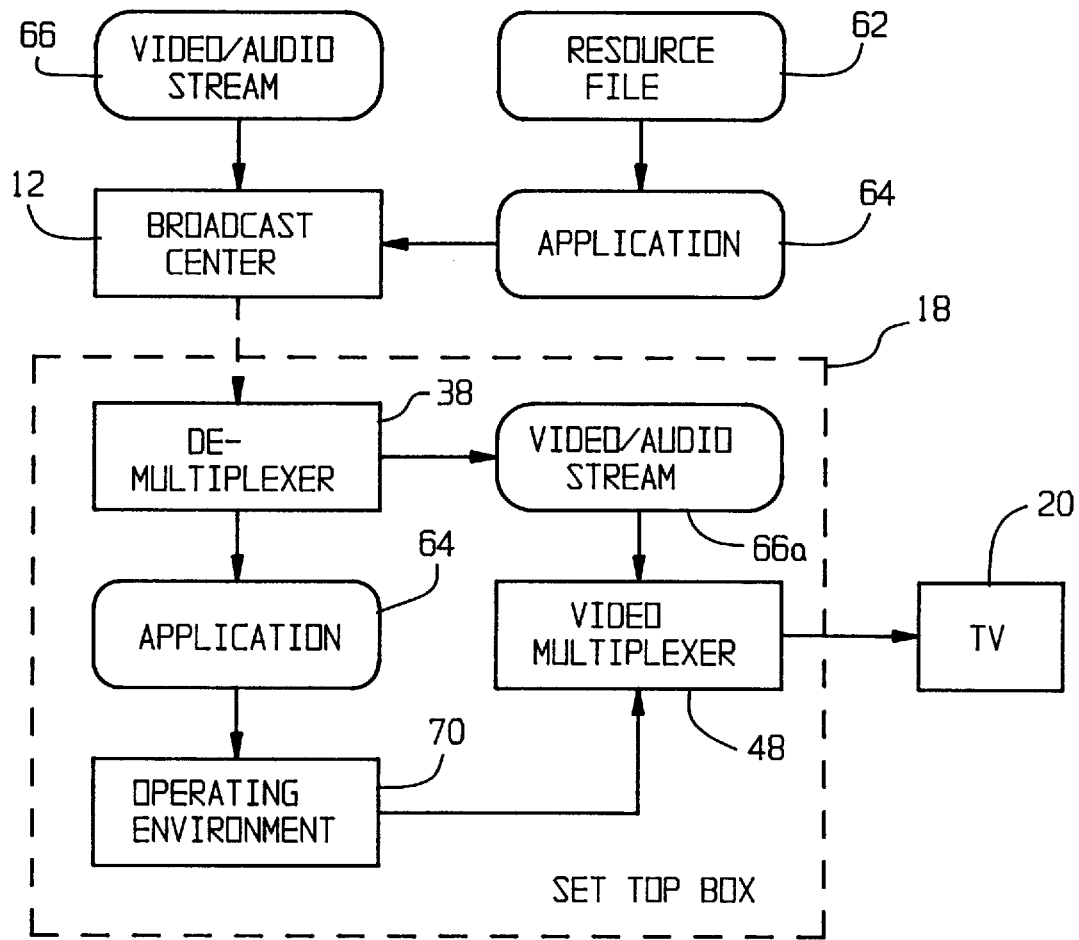
FIG. 3 is a block diagram illustrating the flow of data in the system of FIG. 1.

Referring now to FIG. 3, a block diagram illustrating the flow of data in the system 10 of FIG. 1 is shown. The broadcast center 12 (of FIG. 1) receives an audio/video stream 66 and an application program 64, multiplexes the audio/video stream 66 and the application program 64, and transmits the multiplexed data stream to the set top box 18. Preferably, the language specific textual information of the application program 64 is included in a resource file 62 which is transmitted as part of the application 64 to the set top box 18. By separating the language specific portion of the application 64 in the resource file 62 the application 64 advantageously provides a means whereby changing the textual information from one language to another requires only modification to the resource file 62 rather than to the application 64.

The set top box 18 receives the digital data stream and the demultiplexer 38 of the set top box 18 demultiplexes the application 64 from the audio/video stream 66a. The audio/video stream 66 may have been compressed according to a lossy compression algorithm, hence the decompressed audio/video stream 66a may be in some manner different from the initially transmitted audio/video stream 66.

The application program 64 is executed by an operating environment 70 of the set top box 18. The application program 64 executes within the operating environment 70 to display rendered textual information which is received by the video multiplexer 48 (of FIG. 2) along with the audio/video stream 66a. Video multiplexer 48 multiplexes the rendered text information in the audio/video stream 66a and provides the multiplexed information to the television 20 for display on the television 20.

Figure 4:
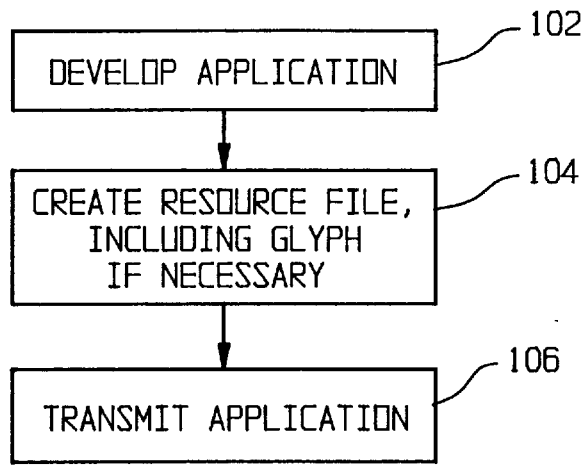
FIG. 4 is a flowchart illustrating steps taken in developing and transmitting an application program in the system of FIG. 1.

Referring now to FIG. 4, a flowchart illustrating steps taken in developing and transmitting an application program in the system of FIG. 1 is shown. An application program developer develops an application such as the application 64 of FIG. 3 in step 102. Preferably, the application program developer does not include the textual information to be displayed on the television 20 (of FIG. 1) in the application program, but rather places the textual information in a resource file such as the resource file 62 of FIG. 3, and includes in the application program 64 references to the textual information.

The application programmer creates a resource file 62 in step 104. The resource file 62 includes formatted chunks of data which may be attached to the application program 64 to avoid embedding the data directly into the application program 64. The resource file 62 advantageously simplifies maintenance and modification of the application program 64 since the data may be changed in the resource file 62 without modification to the tested and debugged application program 64.

Alternatively, the textual information may be contained in the application program 64 itself Preferably, the textual information comprises strings of characters wherein the characters are from the Unicode character set. Preferably, the application developer creates the application 64 and/or resource file 62 using a Unicode-capable text editor, or some other suitable Unicode-capable tool.

Unicode is a multi-lingual character encoding which attempts to include all current written scripts for all current languages. Each character in the Unicode character set is represented by a 16-bit value or code point, thus allowing a character set of 65,536 characters. Unicode is part of the ISO 10646 standard. ISO/IEC 10646-1:1993(E) defines the Unicode standard and is hereby incorporated by reference.

Preferably, creating the resource file in step 104 comprises optionally including one or more glyphs for particular characters referenced by the application program to be displayed on the television 20. If the glyph of a particular character is not already part of a glyph set of the set top box 18, the glyph may be downloaded to the set top box 18 with the application program 64.

Thus, the resource file 62 of the system advantageously provides a means for providing glyphs to the set top box 18. In particular, the means of downloading a glyph to the set top box 18 is advantageous for rendering characters which are infrequently used or special characters, thus allowing the saving of memory storage within the set top box and potentially reducing the cost of the set top box 18. Furthermore, it may be desired to render a character of a language which is not present in the set top box 18. In that situation, the glyph for the Unicode character from the language not present in the set top box 18 may be downloaded with the application program to the set top box 18.

Once the application program and resource file are developed they are provided to the broadcast center 12 which transmits the application to the set top box in step 106.

Figure 5:
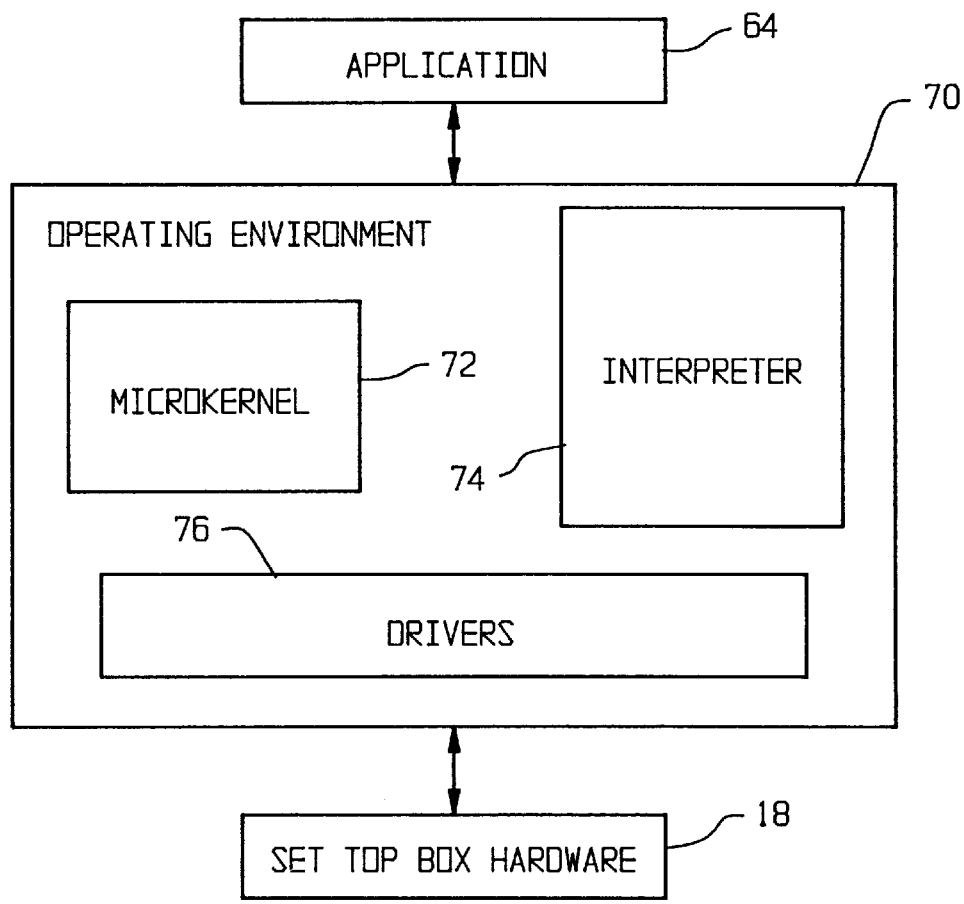
FIG. 5 is a block diagram of the software modules of the set top box of FIG. 2.

Referring now to FIG. 5, a block diagram of the software modules of the set top 18 box of FIG. 2 are shown. The application program 64 (of FIG. 3) communicates with the operating environment 70 (of FIG. 3) which in turn communicates with the set top box hardware 18 to display textual information of the application program 64 on the television 20. The operating environment 70 comprises device drivers 76 for communicating with and controlling the set top box hardware 18. A microkernel 72 provides system services to the various components of the operating environment 70 such as memory management, task management, and communication between tasks, such as the application program 64, and the device drivers 76.

Preferably, the application program 64 comprises instructions which may be interpreted by an interpreter 74. In one embodiment, the interpreted instructions in the application program are referred to as o-code and the interpreter 74 is an o-code interpreter. o-code comprises a stack based instruction set. Preferably, the interpreter 74, the microkernel 72, and the device driver 76 of the operating environment 70 reside in the ROM 30 (of FIG. 2) of the set top box 18. Advantageously, interpreter 74 interpreting the o-code of the application 64 provides a means of developing applications 64 which are independent of the underlying CPU 40 (of FIG. 2) hardware.

The interpreter 74 includes function libraries which are accessible by the application program 64 for performing functions such as allocating memory, manipulating memory, and providing user interface management.

Figure 6:
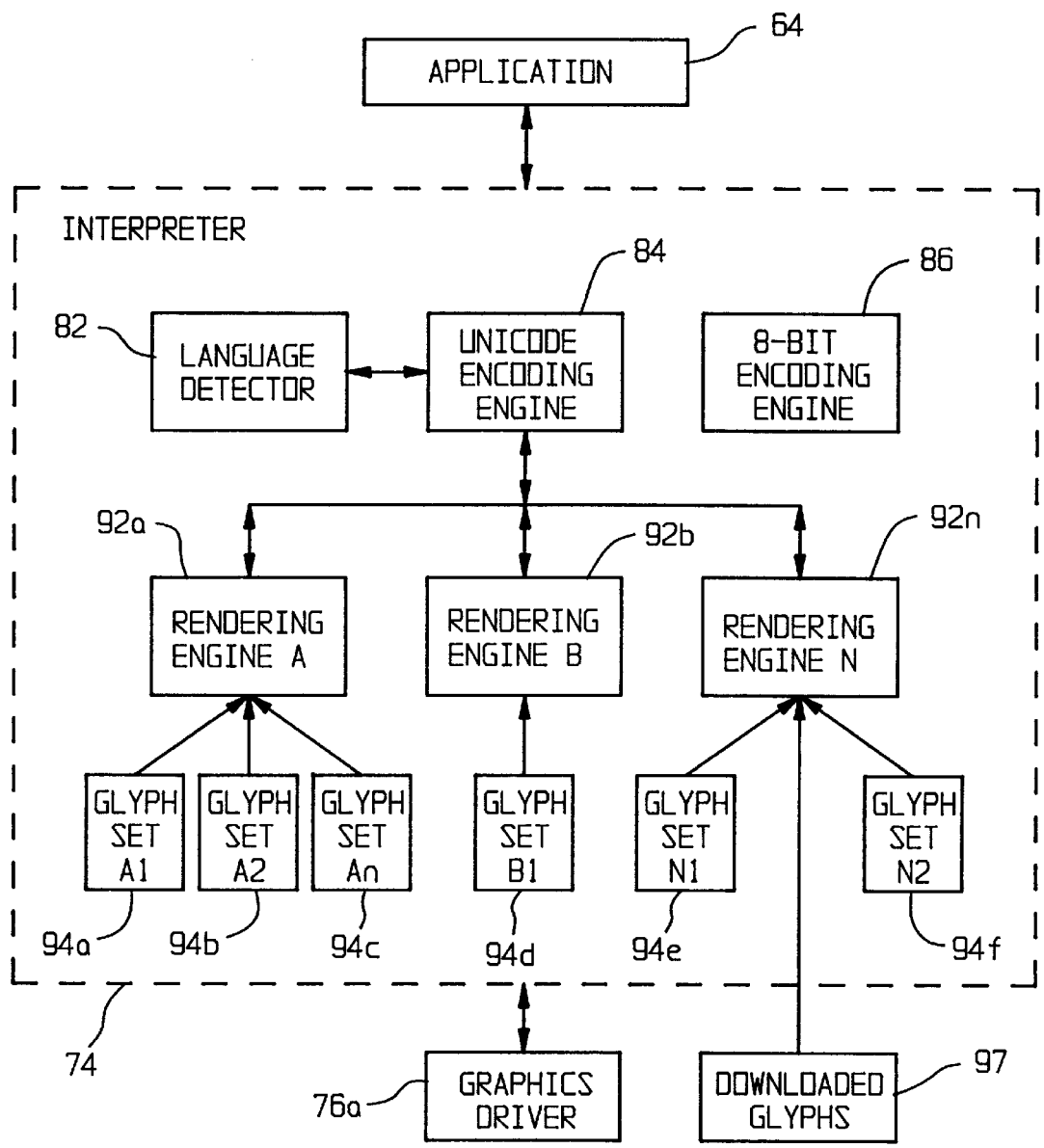
FIG. 6 is a block diagram illustrating in more detail portions of the interpreter of FIG. 4.

Referring now to FIG. 6, a block diagram illustrating in more detail portions of the interpreter 74 of FIG. 4 are shown. An application program 64 executing on the set top box 18 communicates with the interpreter 74 which in turn communicates with a graphics driver 76a of the device drivers 76 (of FIG. 5) to process and render Unicode text for display on television 20 (of FIG. 1). The interpreter 74 comprises a Unicode encoding engine 84.

The Unicode encoding engine 84 provides functions which the application program 64 invokes to perform numerous string manipulation functions such as determining the length of a Unicode string, copying a Unicode string from one location to another, concatenating two Unicode strings together, comparing two Unicode strings to determine if the Unicode strings are identical, and searching a Unicode string for an occurrence of a particular Unicode character within the Unicode string. Preferably, a Unicode string is defined as one or more Unicode characters terminated by a null Unicode character.

The Unicode encoding engine 84 further comprises functions which the application program 64 invokes to set the current font of the Unicode text to be rendered. The Unicode encoding engine 84 further comprises functions which the application 64 invokes for displaying Unicode text on the television 20.

When the application program 64 invokes a function of the Unicode encoding engine 84 to display Unicode text, the Unicode encoding engine 84 invokes a language detector 82 in order to determine a language associated with characters of the Unicode text received from the application program 64. The language detector 82 informs the Unicode encoding engine 84 of the language associated with the Unicode character passed to the language detector 82 by the Unicode encoding engine 84.

The interpreter 74 comprises one or more glyph sets 94a–94f, referred to collectively as 94. The Unicode encoding engine 84 uses the language information returned by the language detector 82 along with font information set by the application program 64 to determine which one of the glyph sets 94 includes a glyph for describing the particular Unicode character to be rendered.

The interpreter 74 further comprises one or more rendering engines 92a–92n, referred to collectively as 92. Each of the rendering engines 92 is configured to render Unicode characters corresponding to a particular language and/or font. As shown, the rendering engines 92 receive glyph information from the glyph sets 94 in order to render Unicode characters. The Unicode encoding engine 84 invokes the appropriate rendering engine from the rendering engines 92 configured to render the particular glyph from one of the glyph sets 94 corresponding to the given Unicode character to be rendered.

As shown, a given rendering engine 92 may be configured to render glyphs from a plurality of glyph sets 94. For example, a rendering engine 92 which renders bitmap glyphs of a fixed pixel height and pixel width for non-contextual languages which render characters from left to right may render characters for most of the Western European languages.

The Unicode encoding engine 84 is further configured to determine the absence of a glyph in the glyph sets 94 for a given character in a language and detect the presence of a downloaded glyph 97 corresponding to a given Unicode character to be rendered. The downloaded glyphs 97 are downloaded to the set top box 18, preferably in the resource file 62 (of FIG. 3) along with the application program 64. The downloaded glyphs 97 are placed in the RAM 32 (of FIG. 2) in a list for access by the Unicode encoding engine 84 and rendering engines 92 in rendering Unicode characters not present in the glyph sets 94.

The interpreter 74 may contain as few as one glyph set 94 and one rendering engine 92. Advantageously, glyph sets 94 may be modularly added to the interpreter 74 as required to accommodate various languages and fonts.

For example, the set top box 18 (of FIG. 2) may be configured with three glyph sets: a glyph set for a 16 point "Courier" English font, a 24 point Courier English font glyph set, and 24 point Japanese font glyph set. The set top box 18 is further configured with a rendering engine for rendering each of the three glyph sets.

Preferably, configuring the set top box 18 in the manner described with modular glyph set modules comprises compiling and linking together the various portions of the operating environment 70 along with the desired glyph sets and programming the operating environment into the ROM 30 (of FIG. 2). Thus, the set top box 18 may be tailored specifically to support the desired languages in a given geographic locale. This localization advantageously enables the same set top box hardware 18 and large portions of the operating environment 70 to be reused without modification. Thus, development time and resources are decreased and the cost of the set top box hardware is reclaimed.

Once the rendering engines 92 have rendered the Unicode characters and produced strings of bits in the RAM memory 32 of the set top box 18 (of FIG. 2), the rendering engines 92 invoke the graphics driver 76a to display the rendered text on the television 20. The graphics driver 76a interacts with the video hardware of the set top box 18 to display the rendered text along with the audio/video data of the television program or commercial on the television 20.

The interpreter 74 further comprises an 8-bit encoding engine 86 for handling 8-bit character encoding strings such as ASCII text. The application program 64 invokes string functions of the 8-bit encoding engine 86 in order to manipulate and display 8-bit character encoding characters on the television 20. Thus, the 8-bit encoding engine 86 performs functions similar to the Unicode coding engine 84 but for 8-bit encoded character strings rather than for Unicode encoded character strings.

Each of the rendering engines 92 is configured to render Unicode text according to rendering rules for the particular language associated with each of the rendering engines 92. For example, a rendering engine associated with a language which is a contextual language has knowledge about how to render characters of a string based on the context of the given character. For example, an Arabic rendering engine contains knowledge about particular kerns or ligatures used in connecting Arabic characters based on neighboring characters.

Furthermore, a rendering engine has specific knowledge regarding the direction in which characters are rendered. For example, a Hebrew rendering engine renders characters from right to left, whereas a French rendering engine renders characters from left to right. Furthermore, rendering engines have specific knowledge about standards of a given locale such as standards for displaying times, dates and currency symbols, for example.

A glyph set from one of the glyph sets 94 comprises a plurality of glyphs organized in a manner optimized for the particular language or set of glyphs in the glyph set. The glyph sets are organized to optimize the time required for look-up of a given Unicode character, as well as to optimize the amount of storage required in order to store the glyph set. Thus, two different glyph sets may be organized in two different manners.

For example, a glyph set comprising a relatively small number of glyphs may be arranged as a simple indexed array. A glyph set comprising a relatively large number of characters such as a Japanese, Chinese, or Korean glyph set may be arranged in a more sophisticated manner such as by using a hash table. Furthermore, glyph sets for contextual languages may include multiple tables according to context. The glyph sets may also be arranged according to glyph representation such as bit-mapped glyphs, outline glyphs, stroke glyphs, etc.

Figure 7:
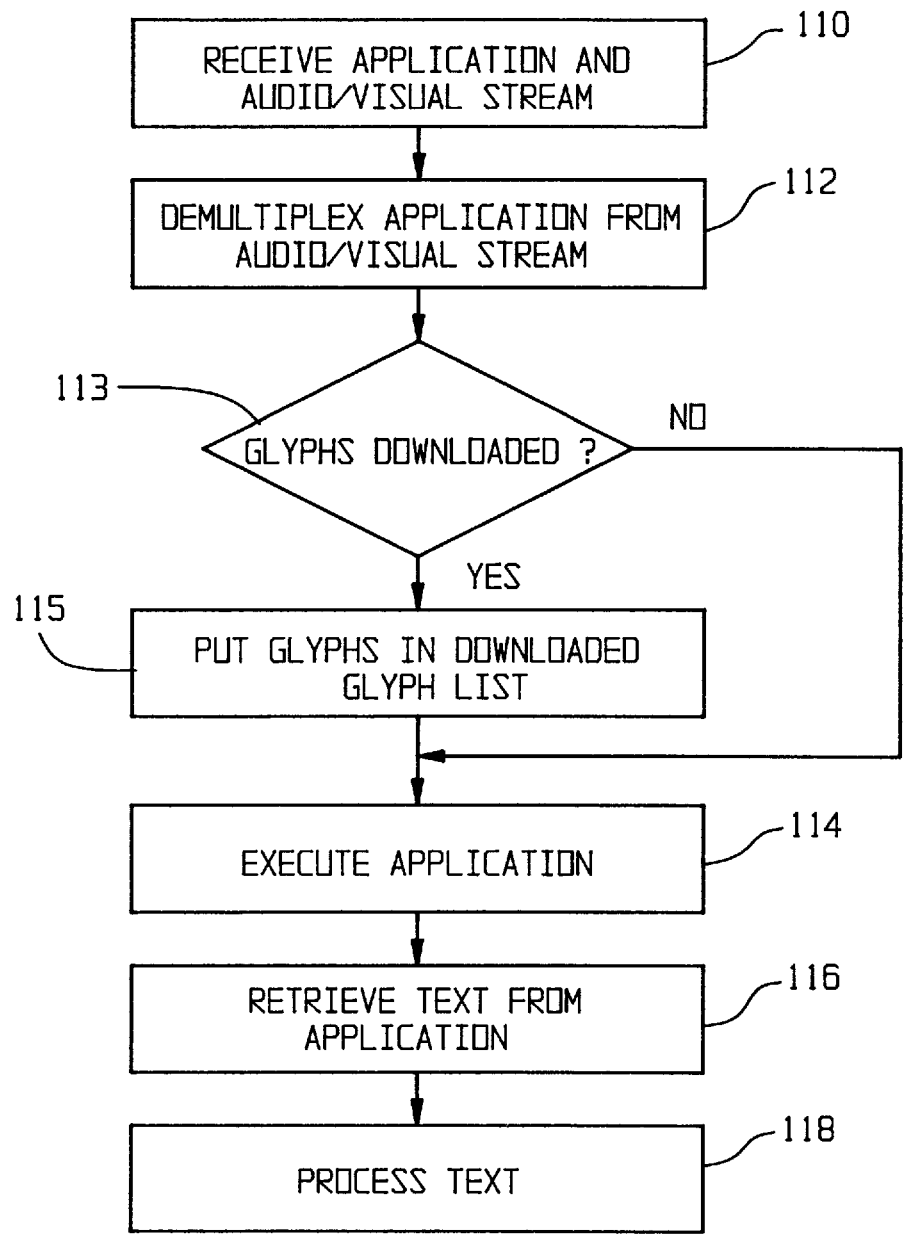
FIG. 7 is a flowchart illustrating steps taken in receiving and rendering multi-lingual text in the system of FIG. 1.

Referring now to FIG. 7, a flowchart illustrating steps taken in receiving and rendering multi-lingual text according to the system of FIG. 1 is shown. The set top box 18 (of FIG. 1) receives a digital data stream including an application program and audio/video information from the broadcast center 12 (of FIG. 1) in step 110. The demultiplexer 38 (of FIG. 2) demultiplexes the application program 64 (of FIG. 3) from the audio/video stream 66 (of FIG. 3) and stores the application program 64 in the RAM memory 32 (of FIG. 2) in step 112.

The operating environment 70 (of FIG. 3) determines if a resource file 62 (of FIG. 3) is present with the application 64, and if so, determines if the resource file 62 includes glyphs for rendering Unicode characters in step 113. If so, the operating environment 70 places the downloaded glyphs into a list of downloaded glyphs 97 (of FIG. 6) for future use by one of the rendering engines 92n (of FIG. 6) in step 115.

The operating environment 70 executes the application program 64 on the CPU 40 (of FIG. 2) in step 114. The application program 64 calls functions of the operating environment 70 to manipulate and display text on the television 20 (of FIG. 3). Preferably, the text is encoded according to the Unicode character encoding. Preferably, the Unicode text is contained within the resource file 62 (of FIG. 3) of the application program 64. Preferably, the application program 64 comprises references to the Unicode text contained in the resource file 62.

The Unicode encoding engine 84 (of FIG. 6) receives the Unicode text from the application program 64 in step 116. The Unicode text received by the Unicode encoding engine 84 comprises one or more Unicode text strings. Preferably, the Unicode encoding engine 84 receives the Unicode text from the resource file 62. The Unicode encoding engine 84 in conjunction with other portions of the interpreter 74, processes the Unicode text for displaying the Unicode text in step 118.

Figure 8:
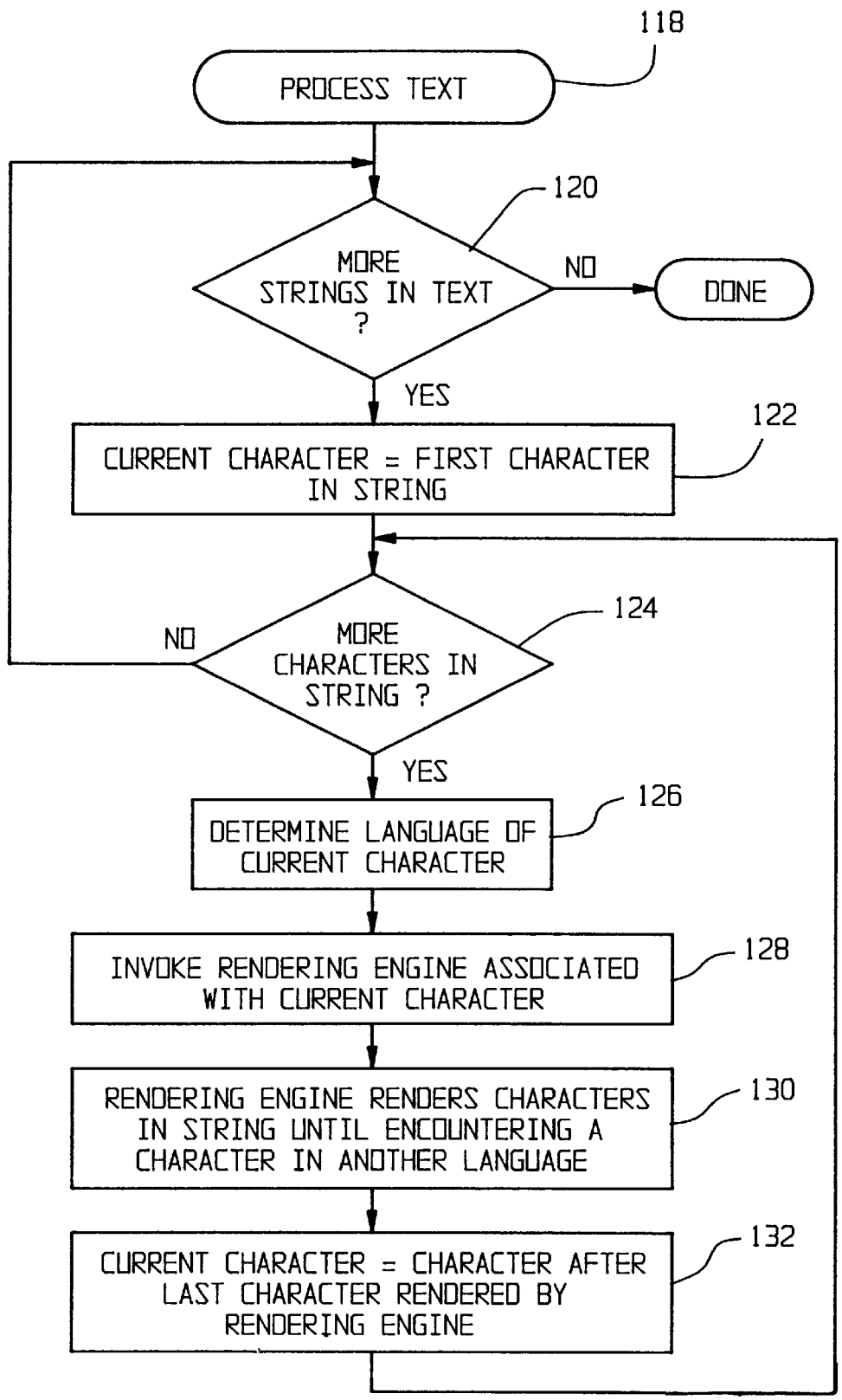
FIG. 8 is a flowchart illustrating in more detail the step of processing text in FIG. 7.

Referring now to FIG. 8, a flowchart illustrating in more detail step 118 (of FIG. 7) of processing the Unicode text is shown. In processing the Unicode text received from the application program 64, the Unicode encoding engine 84 determines whether more Unicode strings exist in the Unicode text received in step 120. If no more Unicode text strings exist, the text has been processed. If more strings exist, the Unicode encoding engine 84 sets a current character variable to reference the first character in the current string to be processed in step 122.

The Unicode encoding engine 84 then determines whether or not more characters exist in the current Unicode string in step 124. If no more Unicode characters exist in the current string, the Unicode encoding engine 84 returns to step 120 to determine if any more strings exist in the text. If more characters exist in the current string as determined in step 124, the Unicode encoding engine 84 invokes the language detector 82 (of FIG. 6) to determine the language of the current character in step 126. The Unicode encoding engine 84 invokes the appropriate one of the rendering engines 92 (of FIG. 6) associated with the language of the current character in step 128.

The Unicode encoding engine 84 invokes the rendering engine by passing a reference to the current string to the rendering engine. The rendering engine renders characters in the string as long as each character encountered is a character in the language associated with the rendering engine in step 130.

Once the rendering engine detects a character not in the language associated with the rendering engine, the rendering engine stops rendering characters of the Unicode string and returns to the Unicode encoding engine 84 information regarding which portion of the Unicode string was rendered by the rendering engine. In step 132 the Unicode encoding engine 84 uses the information returned by the rendering engine concerning which characters of the string were rendered by the rendering engine to assign the current character variable to reference the character after the last character rendered by the rendering engine. The Unicode encoding engine then returns to step 124 to determine if more characters exist in the current string to be rendered.

Thus, each character in the Unicode text received is rendered for display on the television 20 according to the steps of the flowchart of FIG. 8. The steps advantageously enable the set top box 18 to process and render Unicode text comprising characters of different languages.

Figure 9:
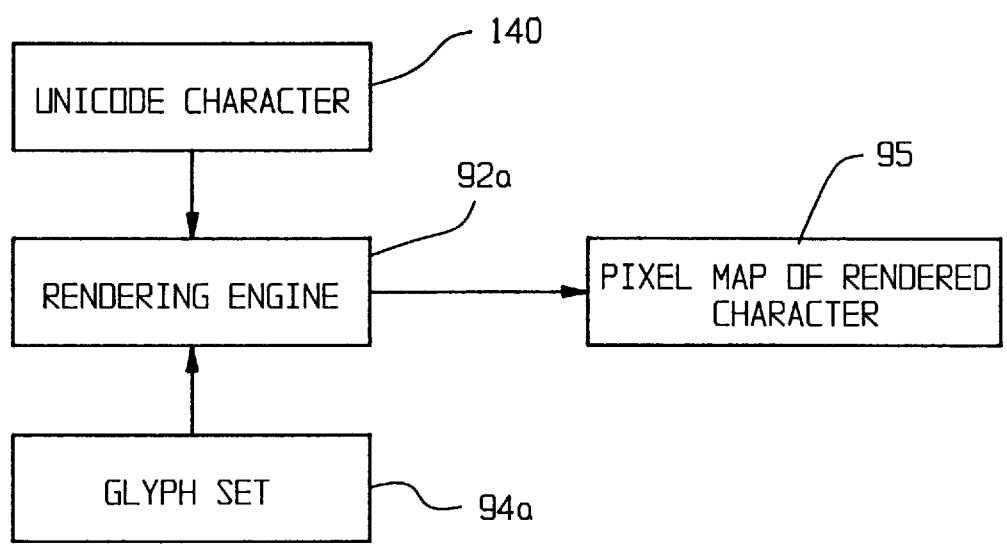
FIG. 9 is a block diagram illustrating the inputs and outputs of a rendering engine of FIG. 5.

Referring now to FIG. 9, a block diagram illustrating the operation of a rendering engine such as the rendering engines 92 (of FIG. 6) is shown. A rendering engine 92a representative of the rendering engines 92 receives a Unicode character 140 and glyph set information 94a representative of the glyph sets 94 (of FIG. 6) and generates a pixel map of the rendered character 95. The rendering engine 92a receives the code point of the Unicode character 140 and uses the code point of the Unicode character 140 to access a corresponding glyph in the glyph set 94a which describes the Unicode character 140.

The pixel map 95 comprises a string of bits indicating the state of each pixel in an array of pixels such as the pixels of a television screen. The state of a pixel is either on or off. A reference to the pixel map 95 is passed to the graphics driver 76a (of FIG. 6) and the graphics driver 76a uses the pixel map to display the rendered character on the television 20.

The rendering engine 92a takes the description of the Unicode character 140 from the glyph of the glyph set 94a representing the Unicode character 140 and generates pixels in the pixel map 95 for display of the Unicode character 140. In the case of a bitmap glyph, rendering the glyph typically comprises copying the string of bits comprising the glyph to the pixel map. In particular, this is true in the case of a non-contextual language.

In the case of a contextual language, the rendering engine 92a modifies the bitmap contained in the glyph to modify or create ligatures or kerns of the glyph based on the context, i.e., the neighboring characters in the string, to produce a modified glyph in the form of the pixel map 95.

In the case of outline glyphs, the rendering engine 92a uses the outline information to generate the pixel map 95. The rendering engine 92a uses the outline information from the glyph along with orientation and sizing information to render the character and produce the pixel map 95. The pixel map 95 may be further modified by other portions of the operating environment 70 to include other properties such as color information in the pixel map 95.

Figure 10:
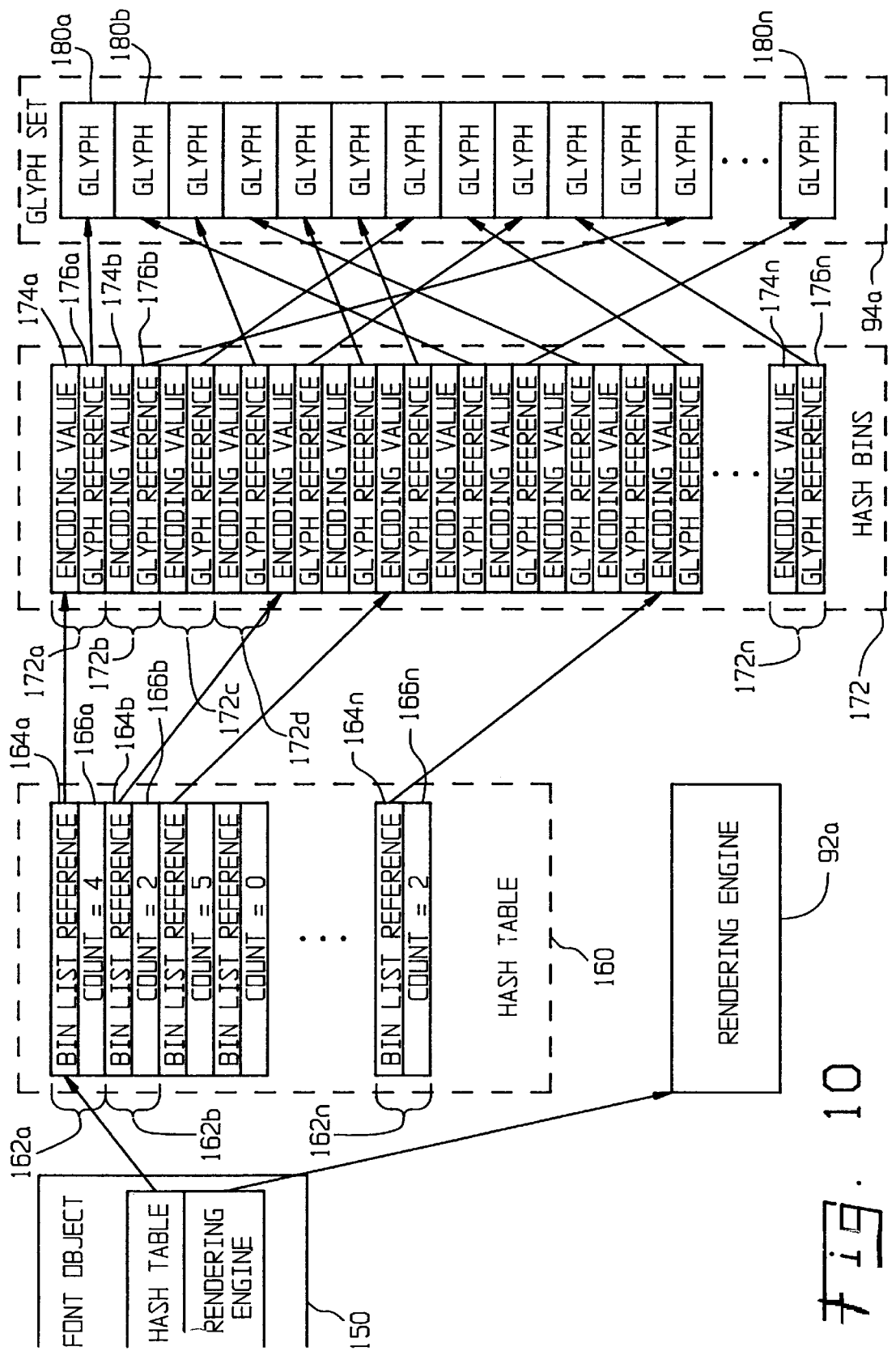
FIG. 10 is a block diagram illustrating data structures used in the hashing method of the present invention according to the preferred embodiment.

Referring now to FIG. 10, a block diagram illustrating data structures used in the hashing method according to the preferred embodiment is shown. The Unicode encoding engine 84 (of FIG. 6) comprises one or more font objects. Font object 150 is a representative font object. The font object 150 is an object according to the notion of objects in object-oriented programniing. The font object 150 comprises methods and data associated with the object.

The font object 150 comprises a reference to a rendering engine 92a of the rendering engines 92 (f FIG. 6)which is a method of the font object 150. The Unicode encoding engine 84 uses the language information from the language detector 82 (of FIG. 6) to determine which font object is associated with the language and current font of the application 64 (of FIG. 3) in order to invoke the rendering engine 92a of the font object 150.

The font object 150 further comprises a reference to an arrangement of a glyph set, such as glyph set 94a of FIG. 6 which is data of the font object 150. FIG. 10 illustrates the arrangement of a glyph set using a hash table 160 and the font object 150 includes a reference to the hash table 160. The glyph set arrangement illustrated in FIG. 10 is particularly useful for efficiently storing and quickly retrieving Unicode characters for languages with a large number of characters, such as Japanese, Chinese, or Korean.

The rendering engine 92a uses the glyphs 180a–180n of the glyph set 94a to render Unicode characters whose glyphs are present in the glyph set 94a.

The hash table 160 includes an array of hash table elements 162a–162n, referred to collectively as 162. Hash table entry 162a will be referred to as a representative hash table entry. The hash table 160 is indexed according to indexes calculated by a hashing method upon Unicode code points described infra. The rendering engine 92a calculates a hash table index and uses the index to calculate the appropriate hash table entry.

Each hash table entry 162a comprises a hash bin list reference 164a–164n, referred to collectively as 164, and a hash bin count 166a–166n, referred to collectively as 166. Hash bin list reference 164a will be referred to as a representative hash bin list reference. Hash bin count 166a wil be referred to as a representative hash bin count.

Each hash bin list reference 164a references a list of hash bins from the array of hash bins 172a–172n, referred to collectively as 172. Hash bin 172a will be referred to as a representative hash bin. The hash bin count 166a indicates the number of hash bins in the list of hash bins referenced by its associated hash bin list reference 164a. FIG. 10 shows example hash bin counts, e.g., hash bin count 166a is 4 and associated hash bin list reference 164a references a hash bin list comprising hash bins 172a–172d, the first of which is hash bin 172a. The hash bin count 166a enables the rendering engine 92a to search a hash bin list and determine when the end of the hash bin list has been reached.

Each hash bin 172a comprises an encoding value 174a, which is representative of encoding values 174a–174n, and a glyph reference 176a, which is representative of glyph references 176a–176n. The encoding value 174a is the code point for a Unicode character. The glyph reference 176a refers to a representative glyph 180a, in the glyph set 94a, describing the Unicode character whose code point is in the encoding value 174a field. The rendering engine 92a uses the glyph 180a referenced by the glyph reference 176a to render the Unicode character whose code point is in the encoding value 174a field.

The operation of the font object 150, i.e., the use of the hash table 160 by the rendering engine 92a, will be described in more detail in the discussion of FIG. 14 and the creation of the hash table 160 will be described in more detail in the discussion of FIG. 13

Figure 11:
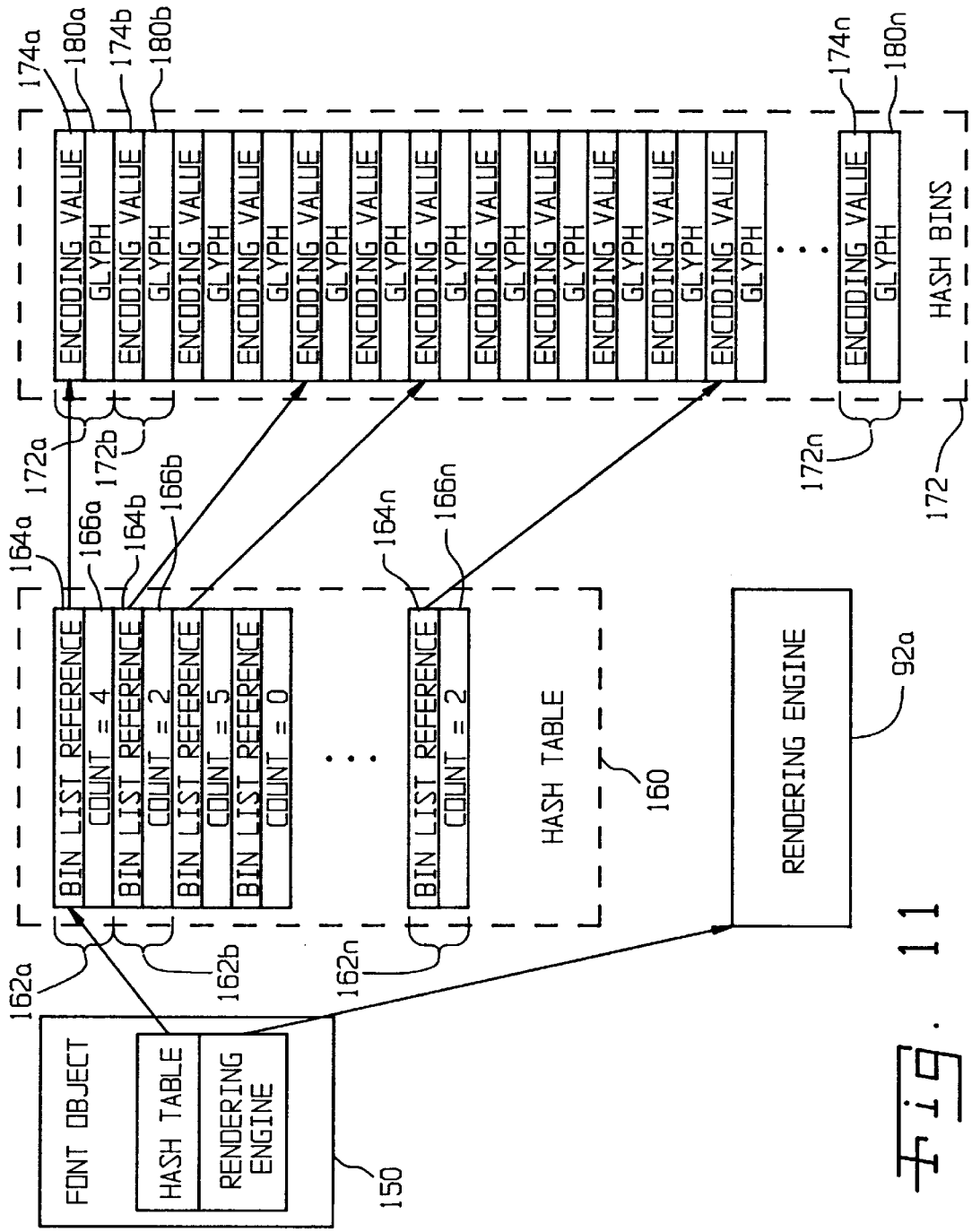
FIG. 11 is a block diagram illustrating data structures used in the hashing method of the present invention according to an alternate embodiment.

Referring now to FIG. 11, a block diagram illustrating data structures used in the hashing method according to an alternate embodiment is shown. The embodiment of FIG. 11 is similar to that of FIG. 10 and corresponding elements are numbered identically for simplicity and clarity. The structure of the embodiment of FIG. 11 is similar to that of FIG. 10 except that the glyph 180a for each Unicode character is included in the hash bin 172a associated with the Unicode character rather than the hash bin 172a having a reference to the glyph 180a. That is, the glyph set 94a is distributed among the hash bins 172.

The embodiment of FIG. 11 has the advantage of using less memory storage space due to the absence of the glyph reference 176a of FIG. 10, but the potential disadvantage of having the glyph set distributed among the hash bins 172.

Figure 12:
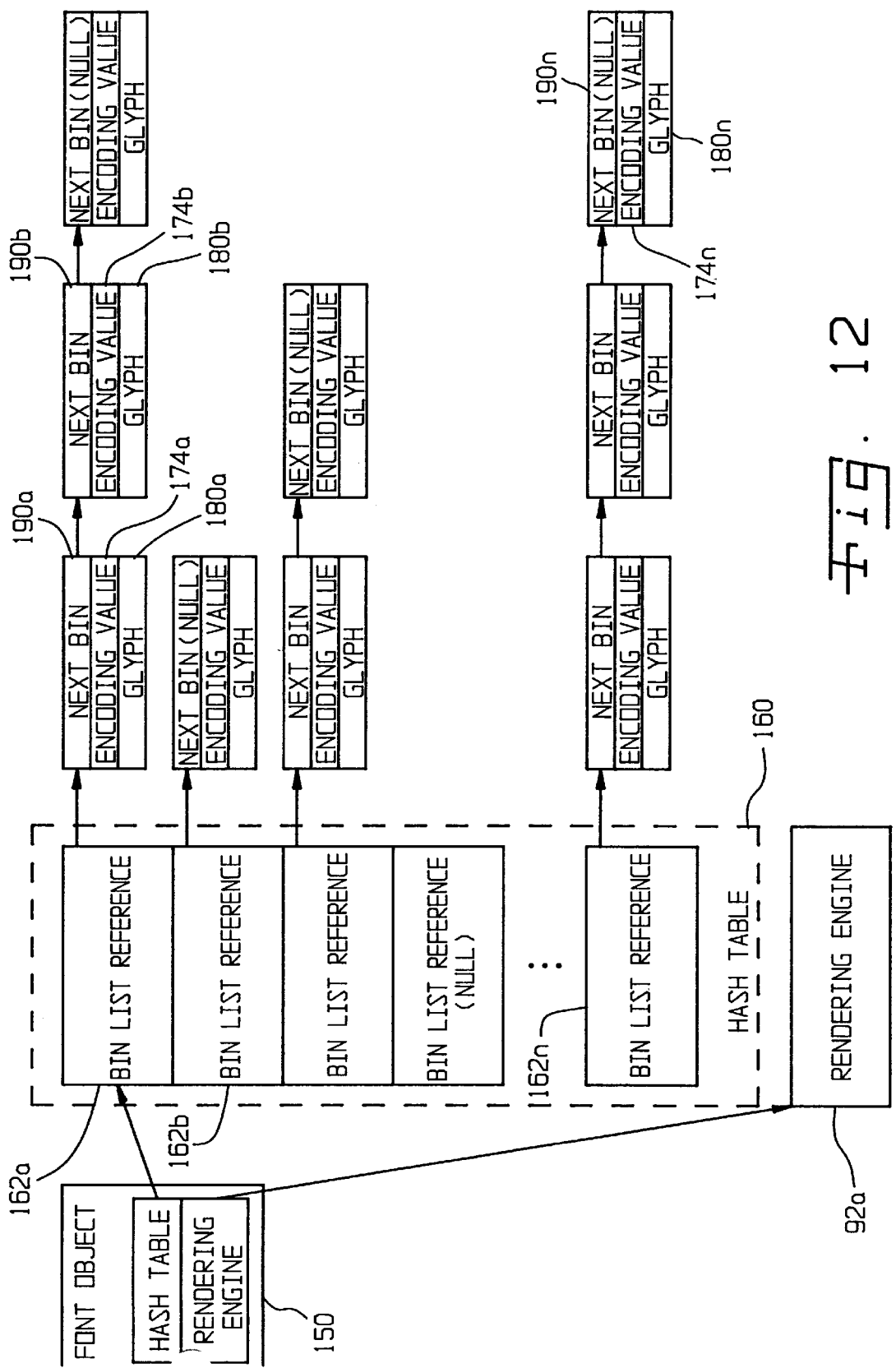
FIG. 12 is a block diagram illustrating data structures used in the hashing method of the present invention according to an alternate embodiment.

Referring now to FIG. 12, a block diagram illustrating data structures used in the hashing method according to an alternate embodiment is shown. The embodiment of FIG. 12 is similar to that of FIG. 11 and corresponding elements are numbered identically for simplicity and clarity. The structure of the embodiment of FIG. 12 is similar to that of FIG. 11 except that the hash bin lists comprise linked lists of hash bins, rather than sequentially arranged lists in an array of hash bins according to FIG. 11.

Each hash bin 172a further comprises a next bin 190a field used to create the linked list of hash bins. The next bin 190a field refers to the next hash bin in the hash bin list or contains a NULL value indicating the end of the hash bin list. The hash bin count 166a field (of FIG. 11) is absent from the hash table elements of FIG. 12 since the end of a hash bin list may be determined by the presence of a NULL value in the next bin 190a field of a hash bin 172a.

The embodiment of FIG. 12 has the advantage of being created using a simpler creation method, but the disadvantage of using more memory storage space due to the presence of the next bin reference.

The hashing method solves the problem of mapping a relatively large set of potential input values, i.e., the entire Unicode code set, to a relatively smaller subset of values, i.e., the code set associated with the subset of Unicode characters used in the Japanese language, or other language with a relatively large number of characters, such as Chinese or Korean.

One solution contemplated is to provide an array of glyphs indexed by the code point of the Unicode character, wherein the size of the array is the size of the Unicode code set, i.e., 65,536 array elements. However, this solution is very costly in terms of memory storage space.

Another solution contemplated is to provide an array of encoding value/glyph pairs, the size of which is the size of the language-specific character subset, which is linearly searched for a matching encoding value. However, this solution is costly in terms of time.

The code points for the characters of a given language are not allocated sequentially in the Unicode code set. For example, the characters which are used in the Japanese language do not occupy a single range of code points in the Unicode code set. If the code points were arranged in a sequential range, a simple array of glyphs, wherein the size of the array is the size of the language-specific character subset, indexed by subtracting from the code point of the character sought the smallest code point in the subset would suffice. However, since the code points are not sequential, this solution is not realizable.

Another solution contemplated is to provide a binary tree, or other tree configuration for arranging the glyph set. This solution is potentially superior to the encoding value/glyph pair solution in terms of time, and potentially superior to the array of glyphs indexed by Unicode code points solution in terms of memory storage space.

The hash tables, however, provides an improved method over the previously contemplated methods for efficiently storing and quickly retrieving Unicode character glyphs as will be discussed with reference to FIGS. 13 and 14.

The number of hash bins 172 and the number of glyphs 180a in the glyph set 94a is equal to the number of Unicode characters whose glyphs are present in the glyph set 94a. Preferably, the Japanese characters of the Unicode character set are stored in the hash table 160. Preferably, the number of hash table elements is 2048.

Figure 13:
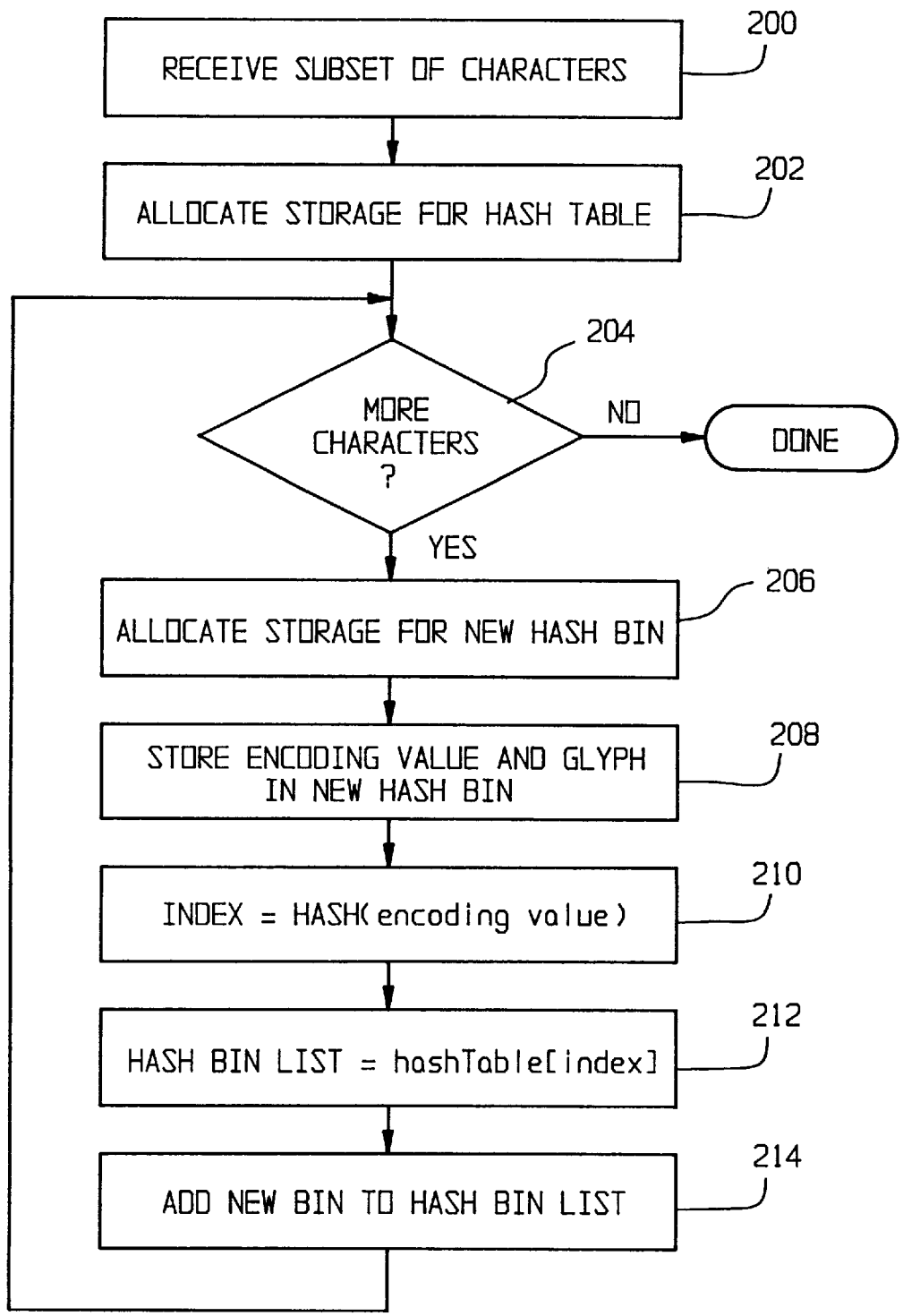
FIG. 13 is a flowchart illustrating steps taken to efficiently store a character set in the set top box of FIG. 2.

Referring now to FIG. 13, a flowchart illustrating steps taken to efficiently store a character subset of the Unicode character set in the hash tables of FIGS. 10–12 of the set top box 18 (of FIG. 2) is shown. Preferably, the steps of the method FIG. 13 are performed by a computer program, referred to as the table generator, which generates a source code file, such as a C language source code file, which includes the data structures described in FIGS. 10–12. The source code files are used to compile and link the operating environment 70 for programming the ROM 30 (of FIG. 2). Alternatively, the steps may be performed by a human to generate the source code files, i.e., the table generator may be a human and/or modification of the computer program-generated source code file. For example, the characters in a given hash bin list may be reordered such that more frequently accessed characters are placed nearer the front of the list to reduce lookup time.

The table generator receives a subset of Unicode characters in step 200. The character subset comprises an encoding value and glyph for each of the characters in the subset. Preferably, the subset is the Unicode characters used in the Japanese language.

The table generator allocates storage for the hash table 160 (of FIGS. 10–12) in step 202. Preferably, allocating storage comprises generating source code data structures for programming into the ROM 30 (of FIG. 2). Allocating storage for the hash table comprises allocating storage for the array of hash table elements 162 (of FIGS. 10–12). Allocating storage for a hash table element comprises allocating storage for a hash bin list reference, such as hash bin list reference 164a (of FIG. 10). In the case of FIGS. 10 and 11, allocating storage for a hash table element further comprises allocating storage for a hash bin count, such as hash bin count 166a (of FIG. 10).

The table generator determines if more characters of the subset need to be stored in step 204. If not, all the characters of the subset have been stored in the hash table.

If a new character is to be stored, the table generator allocates storage for a new hash bin associated with the new character in step 206. Allocating storage for a hash bin comprises allocating storage for an encoding value 174a, and a glyph 180a. In the case of FIG. 10, allocating storage for a new hash bin further comprises allocating storage for a glyph reference 176a. In the case of FIG. 12, allocating storage for a new hash bin further comprises allocating storage for a next bin reference 190a.

The table generator stores the encoding value and glyph of the new character in the newly allocated hash bin in step 208. In the case of FIG. 10, the table generator also populates the glyph reference, such as glyph reference 176a (of FIG. 10) with a reference to the glyph.

The table generator calculates an index into the hash table 160 in step 210 according to the following equation:

index=((((encoding_value & MASK1)>>SHIFTVAL)^encoding_value) & MASK2).

Preferably the constant MASK1 has a value of 0xff, the constant MASK2 has a value of 0x7ff, and the constant SHIFTVAL has a value of 8. The encoding value is the encoding value of the new character to be stored in the hash table. The "&" operation is a bitwise logical AND operation, the "^" operation is a bitwise logical EXCLUSIVE OR operation, and the ">>" operation is a bitwise logical SHIFT RIGHT operation by the number of bits specified by the SHIFTVAL constant.

Preferably, the number of hash table elements is 2048. Using the preferred hash table size, and hashing index equation with the preferred constants to store the Unicode characters used in the Japanese language, advantageously yields a hash table in which only 44 of the 2048 hash table entries are empty, the average hash bin list length, i.e., the average number of "collisions", is 3, the maximum hash bin list length is 8, and 80% of the characters hash to a hash bin list of length of 5 or less. Thus, the hashing method provides an efficient method for storing and a quick method for retrieving Japanese Unicode characters. The present method yields a distribution of hash bin list lengths as shown in Table I.

TABLE I

| Hash bin list length | number of lists of this length |
|---|---|
| 0 | 44 |
| 1 | 171 |
| 2 | 404 |
| 3 | 517 |
| 4 | 456 |
| 5 | 264 |
| 6 | 148 |
| 7 | 35 |
| 8 | 9 |

In step 212 the table generator calculates a reference to a current hash bin list by indexing into the hash table using the index which was calculated in step 210. The current hash bin list reference is the hash bin list reference of the indexed hash table element. The table generator adds the new hash bin which was allocated in step 206 to the current hash bin list in step 214.

With reference to FIGS. 10 and 11, adding the new hash bin to the hash bin list includes incrementing the hash bin list count and determining if the hash bin list is empty. If hash bin list is empty, the hash bin list reference is assigned a reference to the new hash bin.

With reference to FIG. 12, adding the new hash bin to the hash bin list includes assigning the "next" hash bin reference of the new hash bin a terminating value, preferably NULL, and determining if the hash bin list is empty. If the hash bin list is empty, the hash bin list reference is assigned a reference to the new hash bin. If the hash bin list is not empty, the tail of the hash bin list is found and the "next" hash bin reference of the tail hash bin is assigned a reference to the new hash bin.

After adding the new hash bin to the hash bin list, the table generator returns to step 204 to determine if more characters of the subset need to be stored.

Figure 14:
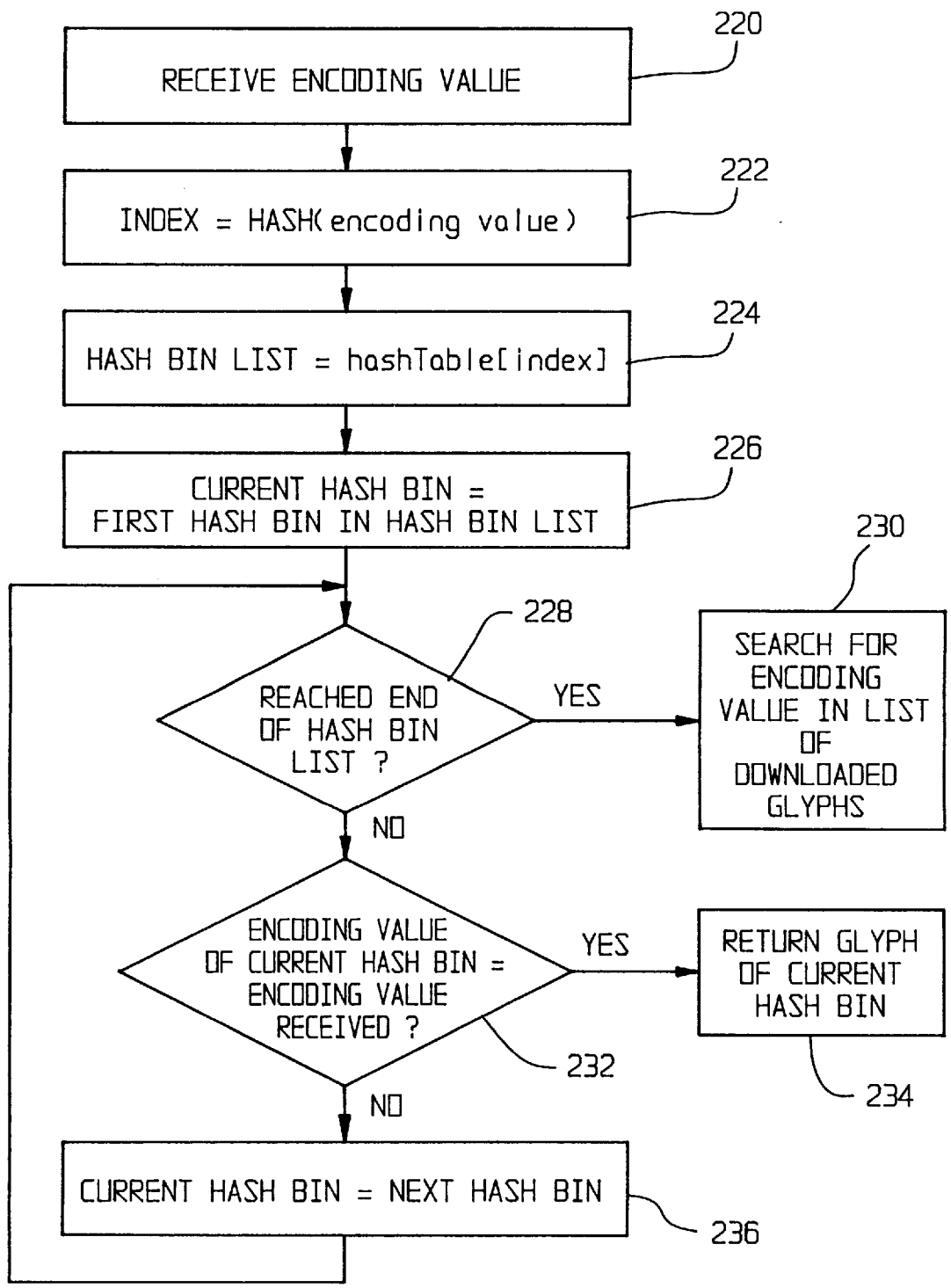
FIG. 14 is a flowchart illustrating steps taken to quickly retrieve a character from the set top box stored according to the method of FIG. 13.

Referring now to FIG. 14, a flowchart illustrating steps taken to quickly retrieve a Unicode character glyph from the hash tables of FIGS. 10–12 of the set top box of FIG. 2 is shown. The steps to retrieve a Unicode character glyph from the hash tables are performed by a rendering engine, such as rendering engine 92a (of FIG. 6). The rendering engine 92a retrieves the Unicode character glyph to use in rendering the specified Unicode character in response to a request from the Unicode encoding engine 84 (of FIG. 6) to render a Unicode string. The rendering engine 92a receives an encoding value, or code point, corresponding to a Unicode character to be rendered in step 220.

The rendering engine 92a calculates an index into the hash table 160 in step 222 according to the same equation used in step 210 (of FIG. 13) to calculate the index. The description of FIG. 13 provides a detailed description of the hashing equation. The description of FIG. 13 also discusses the various list length results, shown in Table I, of the hashing method, which are pertinent to the retrieval time associated with the method.

In step 224 the rendering engine 92a calculates a reference to a hash bin list by indexing into the hash table using the index which was calculated in step 222. The hash bin list reference is the hash bin list reference of the indexed hash table element. The rendering engine 92a assigns a current hash bin reference to the first hash bin in the hash bin list in step 226.

The rendering engine 92a determines if the end of the hash bin list has been reached in step 228. Determining if the end of the hash bin list has been reached includes determining if the number of hash bins visited in hash bin list is greater than the hash bin list count value in the case of FIGS. 10 and 11. "Visiting" a hash bin means assigning the current hash bin reference to a new value, as is performed in steps 226 and 236. Determining if the end of the hash bin list has been reached includes determining if the current hash bin reference has a NULL value in the case of FIG. 12.

If the end of the hash bin list has been reached, then the glyph for the Unicode character corresponding to the encoding value which was received in step 220 is not present in the hash table 160. In this case, in step 230 the rendering engine 92a searches the list of downloaded glyphs 97 (of FIG. 6) to find the glyph for the Unicode character corresponding to the encoding value which was received in step 220. If the glyph is not present in the list of downloaded glyphs 97 then an error has occurred.

If the end of the hash bin list has not been reached, in step 232, the rendering engine 92a determines if the encoding value of the current hash bin is equal to the encoding value which was received in step 220. If not, the current hash bin reference is assigned a reference to the next hash bin in the hash bin list in step 236 and the rendering engine 92a returns to step 228. However, if the encoding values are equal, the rendering engine 92a returns a reference to the glyph of the current hash bin in step 234.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for efficiently storing a subset of characters from a set of characters, wherein the set of characters are encoded according to a set of encoding values, wherein each of the characters has a unique associated encoding value, the method comprising:

receiving a character of said subset of characters, wherein said character comprises an encoding value and a glyph describing a graphic representation of said character;

allocating storage for a hash bin comprising storage for an encoding value and a glyph;

storing said encoding value and said glyph in said hash bin;

calculating an index according to an equation index=((((encoding_value & MASK1)>>SHIFTVAL)^encoding_value) & MASK2), wherein said MASK1, MASK2, and SHIFTVAL are predefined constants;

calculating a reference to a hash bin list by indexing into a hash table of references to hash bin lists using said index;

adding said hash bin to said hash bin list;

performing said receiving, said allocating, said storing, said calculating an index, said calculating a reference, and said adding for each character in said subset of characters.

2. The method as recited in claim 1, wherein said set of encoding values comprises the Unicode set of encoding values.

3. The method as recited in claim 1, wherein said subset of characters comprises characters from at least one language.

4. The method as recited in claim 3, wherein said at least one language includes at least one from the group comprising: Japanese, Chinese, Korean, Thai, Arabic, Indic, and European languages.

5. The method as recited in claim 1, wherein said MASK1 constant is 0x0ff, said MASK2 constant is 0x07ff, and said SHIFTVAL constant is 8.

6. The method as recited in claim 1, wherein said hash table of references comprises 2048 references to hash bin lists.

7. The method as recited in claim 1, wherein said hash bin further comprises a reference to said glyph, wherein said storage for said bin comprises a first portion for said glyph and a second portion for said encoding value and said reference.

8. The method as recited in claim 1, wherein said hash bin list comprises a linked list of hash bins.

9. The method as recited in claim 1, wherein said hash bin list comprises an array of hash bins.

10. The method as recited in claim 8, wherein said reference to said hash bin list comprises a count of hash bins in said hash bin list.

11. The method as recited in claim 1, further comprising allocating storage for said hash table prior to said allocating storage for a hash bin.

12. A method for quickly retrieving a character of a subset of characters from a set of characters, wherein the set of characters are encoded according to a set of encoding values, wherein each of the characters has a unique associated encoding value, the method comprising:

receiving an encoding value of a character in said subset of characters;

calculating an index according to an equation, index=((((encoding_value & MASK1)>>SHIFTVAL)^encoding_value) & MASK2), wherein said MASK1, MASK2, and SHIFTVAL are predefined constants;

calculating a reference to a hash bin list by indexing into a hash table of references to hash bin lists using said index, wherein a hash bin includes an encoding value and a glyph describing a graphic representation of a character;

searching said hash bin list for a hash bin having an encoding value equal to said encoding value of said character; and returning a glyph of said hash bin having an encoding value equal to said encoding value of said character.

13. The method as recited in claim 12, wherein said searching comprises:
referencing a first hash bin of said hash bin list as a current hash bin;
determining if an encoding value of said current hash bin is equal to said encoding value of said character;
assigning said current hash bin to be a next hash bin in said list of hash bins if said encoding value of said current hash bin is not equal to said encoding value of said character; and
performing said determining and said assigning until said encoding value of said current hash bin is equal to said encoding value of said character.

14. The method as recited in claim 12, wherein said set of encoding values comprises the Unicode set of encoding values.

15. The method as recited in claim 12, wherein said subset of characters comprises characters from at least one language.

16. The method as recited in claim 15, wherein said at least one language includes at least one from the group comprising: Japanese, Chinese, Korean, Thai, Arabic, Indic, and European languages.

17. The method as recited in claim 12, wherein said MASK1 constant is 0x0ff, said MASK2 constant is 0x07ff, and said SHIFTVAL constant is 8.

18. The method as recited in claim 12, wherein said hash table of references comprises 2048 references to hash bin lists.

19. The method as recited in claim 12, wherein said hash bin further comprises a reference to said glyph.

20. The method as recited in claim 12, wherein said hash bin list comprises a linked list of hash bins.

21. The method as recited in claim 12, wherein said hash bin list comprises an array of hash bins.

22. The method as recited in claim 21, wherein said reference to said hash bin list comprises a count of hash bins in said hash bin list.

23. A set top box for displaying a character on a television, wherein the character is of a subset of characters from a set of characters, wherein the set of characters are encoded according to a set of encoding values, wherein each of the characters has a unique associated encoding value, comprising:
a processor configured to execute program instructions; and
a memory coupled to said processor configured to store said program instructions,
wherein said program instructions comprise:
instructions for receiving an encoding value of a character in said subset of characters;
instructions for calculating an index according to an equation, index=((((encoding_value & MASK1)>>SHIFTVAL)^encoding_value) & MASK2), wherein said MASK1, MASK2, and SHIFTVAL are predefined constants;
instructions for calculating a reference to a hash bin list by indexing into a hash table of references to hash bin lists using said index, wherein a hash bin comprises storage for an encoding value and a glyph describing a graphic representation of said character;
instructions for searching said hash bin list for a hash bin having an encoding value equal to said encoding value of said character;
instructions for returning a glyph of said hash bin having an encoding value equal to said encoding value of said character; and
instructions for rendering said glyph for display on the television.

24. The set top box as recited in claim 23, wherein said set of encoding values comprises the Unicode set of encoding values.

25. The set top box as recited in claim 23, wherein said subset of characters comprises characters from at least one language.

26. The set top box as recited in claim 25, wherein said at least one language includes at least one from the group comprising: Japanese, Chinese, Korean.

27. The set top box as recited in claim 23, wherein said MASK1 constant is 0x0ff, said MASK2 constant is 0x07ff, and said SHIFTVAL constant is 8.

28. The set top box as recited in claim 23, wherein said hash table of references comprises 2048 references to hash bin lists.

29. The set top box as recited in claim 23, further comprising instructions for allocating storage for said hash table prior to said allocating storage for a hash bin.

30. A set top box for displaying a character on a television, wherein the character is of a subset of characters from a set of characters, wherein the set of characters are encoded according to a set of encoding values, wherein each of the characters has a unique associated encoding value, comprising:
a processor configured to execute program instructions; and
a memory coupled to said processor configured to store said program instructions, wherein said program instructions comprise:
instructions for receiving an encoding value of a character in said subset of characters;
instructions for calculating an index according to an equation, index=((((encoding_value & MASK1)>>SHIFTVAL)^encoding_value) & MASK2);

wherein said MASK1, MASK2, and SHIFTVAL are predefined constants;
instructions for calculating a reference to a hash bin list by indexing into a hash table of references to hash bin lists using said index, wherein a hash bin includes an encoding value and a glyph describing a graphic representation of said character;
instructions for searching said hash bin list for a hash bin having an encoding value equal to said encoding value of said character; and
instructions for returning a glyph of said hash bin having an encoding value equal to said encoding value of said character.

31. The set top box as recited in claim 30, wherein said instructions for searching comprise:
instructions for referencing a first hash bin of said hash bin list as a current hash bin;
instructions for determining if an encoding value of said current hash bin is equal to said encoding value of said character;
instructions for assigning said current hash bin to be a next hash bin in said list of hash bins if said encoding value of said current hash bin is not equal to said encoding value of said character; and
instructions for performing said determining and said assigning until said encoding value of said current hash bin is equal to said encoding value of said character.

32. The set top box as recited in claim 30, wherein said set of encoding values comprises the Unicode set of encoding values.

33. The set top box as recited in claim 30, wherein said subset of characters comprises characters from at least one language.

34. The set top box as recited in claim 33, wherein said at least one language includes at least one from the group comprising: Japanese, Chinese, Korean.

35. The set top box as recited in claim 30, wherein said MASK1 constant is 0x0ff, said MASK2 constant is 0x07ff, and said SHIFTVAL constant is 8.

36. The set top box as recited in claim 30, wherein said hash table of references comprises 2048 references to hash bin lists.

* * * * *